United States Patent
Backus

(10) Patent No.: US 11,198,991 B1
(45) Date of Patent: Dec. 14, 2021

(54) SYSTEM AND METHOD FOR FLUID HANDLING IN A SHOWER OR BATH

(71) Applicant: Alan Backus, Los Angeles, CA (US)

(72) Inventor: Alan Backus, Los Angeles, CA (US)

( * ) Notice: Subject to any disclaimer, the term of this patent is extended or adjusted under 35 U.S.C. 154(b) by 0 days.

(21) Appl. No.: 17/213,651

(22) Filed: Mar. 26, 2021

(51) Int. Cl.
*E03C 1/00* (2006.01)
*E03C 1/04* (2006.01)
*G01F 23/32* (2006.01)
*E03C 1/242* (2006.01)
*E03C 1/02* (2006.01)

(52) U.S. Cl.
CPC ............ *E03C 1/0408* (2013.01); *E03C 1/242* (2013.01); *G01F 23/32* (2013.01); *E03C 2001/026* (2013.01)

(58) Field of Classification Search
CPC ...... E03C 1/0408; E03C 1/046; E03C 1/0465; E03C 1/055; E03C 1/242; G01F 23/36; G01F 23/363
See application file for complete search history.

(56) References Cited

U.S. PATENT DOCUMENTS

| | | |
|---|---|---|
| 1,820,981 A | 3/1923 | Le Fever |
| 1,857,627 A | 2/1930 | Elder |
| 2,180,790 A | 11/1939 | Brummett |
| 2,906,301 A | 3/1956 | Manon |
| 2,908,017 A | 4/1957 | Whaley |
| 2,926,360 A | 7/1958 | Erickson et al. |
| 2,877,467 A | 3/1959 | Cloud |
| 3,507,420 A | 4/1970 | Nelson et al. |
| 3,541,614 A | 11/1970 | Zorn |
| 3,771,333 A | 11/1973 | Jurjans |
| 3,809,116 A | 5/1974 | Sanner |
| 4,013,091 A | 3/1977 | Hudson |
| 4,042,984 A | 8/1977 | Butler |
| 4,099,272 A | 7/1978 | Sowder |
| 4,106,338 A | 8/1978 | Castle |
| 4,174,743 A | 11/1979 | Beny et al. |
| 4,243,066 A | 1/1981 | Lambie |
| 4,258,444 A * | 3/1981 | Orszullok ............... E03C 1/242 137/392 |
| 4,258,746 A | 3/1981 | Hudson |
| 4,295,488 A | 10/1981 | Book |
| 4,327,764 A | 5/1982 | Biederman et al. |
| 4,385,911 A | 5/1983 | Popeil et al. |
| 4,409,694 A | 10/1983 | Barrett, Sr. et al. |
| 4,431,025 A | 2/1984 | Edwards |
| 4,467,482 A | 8/1984 | Dyer |
| 4,524,798 A | 6/1985 | Simard |
| 4,535,931 A | 8/1985 | Bartok et al. |
| 4,563,780 A | 1/1986 | Pollack |

(Continued)

FOREIGN PATENT DOCUMENTS

WO    WO2007132143 A2    11/2007

*Primary Examiner* — Reinaldo Sanchez-Medina
(74) *Attorney, Agent, or Firm* — Ulmer & Berne LLP

(57) ABSTRACT

Showerhead devices incorporate sensors to control bath fill levels. Showerheads have interchangeable attachments, including bristle attachments. Oral care devices are attachable to standard shower arms. Pump devices allow various lotions and fluids to be used in conjunction with showers. Shower organizing devices provide for ordered storage and access to accessories. Bathtub spouts including sensors and valves to control bathtub filled levels.

8 Claims, 32 Drawing Sheets

(56) References Cited

U.S. PATENT DOCUMENTS

| | | |
|---|---|---|
| 4,607,658 A | 8/1986 | Fraser et al. |
| 4,628,956 A | 12/1986 | Roberts et al. |
| 4,635,844 A | 1/1987 | Barrett, Sr. et al. |
| 4,640,307 A | 2/1987 | Roberts |
| 4,687,019 A | 8/1987 | Mayfield |
| 4,753,265 A | 6/1988 | Barrett et al. |
| 4,757,305 A | 7/1988 | Peso |
| 4,796,650 A | 1/1989 | Hwang |
| 4,807,862 A | 2/1989 | Popeil et al. |
| 4,903,724 A | 2/1990 | Simard |
| 4,948,106 A | 8/1990 | Popeil et al. |
| 5,017,143 A | 5/1991 | Backus et al. |
| 5,025,509 A | 6/1991 | Holt et al. |
| 5,030,027 A | 7/1991 | Bachrach et al. |
| 5,133,788 A | 7/1992 | Backus |
| 5,159,723 A | 11/1992 | Benedict |
| 5,166,886 A | 11/1992 | Molnar et al. |
| 5,195,145 A | 3/1993 | Backus et al. |
| 5,197,736 A | 3/1993 | Backus et al. |
| 5,203,038 A * | 4/1993 | Gibbs .................. E04H 4/12 4/508 |
| 5,221,962 A | 6/1993 | Backus et al. |
| 5,324,185 A | 6/1994 | Backus et al. |
| 5,345,625 A | 9/1994 | Diemand |
| 5,381,566 A | 1/1995 | Sonesson et al. |
| 5,421,713 A | 6/1995 | Backus et al. |
| 5,441,529 A | 8/1995 | Dorsch |
| 5,515,990 A | 5/1996 | Popeil et al. |
| 5,720,991 A | 2/1998 | Gildersleeve et al. |
| 5,731,012 A | 3/1998 | Backus et al. |
| 5,850,848 A | 12/1998 | Jandal et al. |
| RE36,147 E | 3/1999 | Backus et al. |
| 5,882,116 A | 3/1999 | Backus |
| 5,915,408 A | 6/1999 | Dudley |
| 6,026,842 A | 2/2000 | Gallant |
| 6,062,255 A | 5/2000 | Busick |
| 6,142,064 A | 11/2000 | Backus et al. |
| 6,170,390 B1 | 1/2001 | Backus et al. |
| 6,173,645 B1 | 1/2001 | Backus et al. |
| 6,240,838 B1 | 6/2001 | Backus et al. |
| 6,250,214 B1 | 6/2001 | Backus et al. |
| 6,253,665 B1 | 7/2001 | Backus et al. |
| 6,330,855 B2 | 12/2001 | Backus et al. |
| 6,393,972 B1 | 5/2002 | Backus et al. |
| 6,408,742 B1 | 6/2002 | Backus et al. |
| 6,422,136 B1 | 7/2002 | Backus et al. |
| 6,436,380 B1 | 8/2002 | Pond et al. |
| 6,450,087 B2 | 9/2002 | Backus et al. |
| 6,536,334 B2 | 3/2003 | Backus et al. |
| 6,568,315 B2 | 5/2003 | Backus et al. |
| 6,568,316 B1 | 5/2003 | Backus et al. |
| 6,578,470 B2 | 6/2003 | Backus et al. |
| 6,658,991 B2 | 12/2003 | Backus et al. |
| 6,732,388 B2 | 5/2004 | McKenna |
| 6,742,199 B2 | 6/2004 | Conway et al. |
| 6,742,445 B2 | 6/2004 | Backus et al. |
| 6,743,007 B2 | 6/2004 | Backus et al. |
| 6,782,805 B2 | 8/2004 | Backus et al. |
| 6,782,806 B2 | 8/2004 | Backus et al. |
| 6,814,957 B1 | 11/2004 | Pond et al. |
| 6,837,150 B2 | 1/2005 | Backus et al. |
| 6,840,161 B2 | 1/2005 | Backus et al. |
| 6,874,408 B2 | 4/2005 | Backus et al. |
| 6,886,589 B2 | 5/2005 | Oretti |
| 6,895,610 B2 | 5/2005 | Olson |
| 6,965,095 B1 | 11/2005 | Popeil et al. |
| 6,988,445 B1 | 1/2006 | Backus et al. |
| 6,994,107 B2 | 2/2006 | Sosa |
| 7,021,203 B2 | 4/2006 | Backus et al. |
| 7,021,204 B2 | 4/2006 | Backus et al. |
| 7,065,883 B2 | 6/2006 | Popeil et al. |
| 7,138,609 B2 | 11/2006 | Pepeil et al. |
| 7,153,120 B2 | 12/2006 | Backus et al. |
| 7,219,618 B1 | 5/2007 | Shaughnessy |
| 7,225,729 B2 | 6/2007 | Backus et al. |
| 7,225,730 B2 | 6/2007 | Backus et al. |
| 7,325,484 B1 | 2/2008 | Backus et al. |
| 7,395,602 B2 | 7/2008 | Backus et al. |
| 7,424,849 B2 | 9/2008 | Backus et al. |
| 7,500,428 B2 | 3/2009 | Backus et al. |
| 7,514,651 B2 | 4/2009 | Popeil et al. |
| 7,626,142 B2 | 12/2009 | Backus et al. |
| 7,681,494 B2 | 3/2010 | Backus et al. |
| 7,739,948 B2 | 6/2010 | Backus et al. |
| 7,878,111 B2 | 2/2011 | Backus et al. |
| 7,998,514 B2 | 8/2011 | Backus et al. |
| 8,017,167 B2 | 9/2011 | Backus et al. |
| 8,065,759 B2 | 11/2011 | Smushkovich et al. |
| 8,083,864 B2 | 12/2011 | Ho |
| 8,186,265 B2 | 5/2012 | Popeil et al. |
| 8,205,394 B1 | 6/2012 | Jackman et al. |
| 8,309,151 B2 | 11/2012 | Popeil et al. |
| 8,387,520 B2 | 3/2013 | Backus |
| 8,707,857 B2 | 4/2014 | Popeil et al. |
| 8,720,867 B2 | 5/2014 | Cunningham et al. |
| 8,807,022 B2 | 8/2014 | Backus |
| 8,850,965 B2 | 10/2014 | Popeil et al. |
| 8,869,686 B2 | 10/2014 | Backus |
| 10,412,981 B2 | 9/2019 | Popeil |
| 10,876,313 B1 | 12/2020 | Schmidt |
| 2001/0009128 A1 | 2/2001 | Backus et al. |
| 2001/0022140 A1 | 2/2001 | Backus et al. |
| 2001/0032547 A1 | 2/2001 | Backus et al. |
| 2001/0042449 A1 | 6/2001 | Backus et al. |
| 2001/0046337 A1 | 6/2001 | Backus et al. |
| 2001/0006627 A1 | 7/2001 | Pond et al. |
| 2001/0039884 A1 | 11/2001 | Backus et al. |
| 2002/0017201 A1 | 2/2002 | Backus et al. |
| 2002/0023541 A1 | 2/2002 | Sanchez |
| 2002/0023545 A1 | 2/2002 | Backus et al. |
| 2002/0023546 A1 | 2/2002 | Backus et al. |
| 2002/0088350 A1 | 2/2002 | Backus et al. |
| 2002/0144607 A1 | 3/2002 | Backus et al. |
| 2002/0108503 A1 | 4/2002 | Backus et al. |
| 2002/0050212 A1 | 5/2002 | Backus et al. |
| 2002/0062742 A1 | 5/2002 | Backus et al. |
| 2002/0069768 A1 | 6/2002 | Backus et al. |
| 2002/0157543 A1 | 6/2002 | Backus et al. |
| 2002/0166458 A1 | 6/2002 | Backus et al. |
| 2002/0108500 A1 | 8/2002 | Backus et al. |
| 2002/0162169 A1 | 11/2002 | Bouchard |
| 2002/0195003 A1 | 12/2002 | Backus et al. |
| 2003/0019368 A1 | 1/2003 | Backus et al. |
| 2003/0126997 A1 | 2/2003 | Backus et al. |
| 2003/0101877 A1 | 6/2003 | Backus et al. |
| 2003/0196261 A1 | 10/2003 | Olson |
| 2004/0006876 A1 | 1/2004 | Popeil et al. |
| 2004/0007494 A1 | 1/2004 | Popeil et al. |
| 2004/0144260 A1 | 7/2004 | Backus et al. |
| 2004/0173688 A1 | 9/2004 | Gloodt |
| 2004/0194644 A1 | 10/2004 | Backus et al. |
| 2005/0178275 A1 | 1/2005 | Backus et al. |
| 2005/0056633 A1 | 3/2005 | Backus et al. |
| 2005/0058738 A1 | 3/2005 | Backus et al. |
| 2005/0088308 A1 | 4/2005 | King, Jr. |
| 2005/0284306 A1 | 8/2005 | Backus et al. |
| 2005/0204468 A1 | 9/2005 | Gunn |
| 2005/0251906 A1 | 11/2005 | Scott et al. |
| 2006/0144248 A1 | 3/2006 | Backus et al. |
| 2006/0144250 A1 | 3/2006 | Backus et al. |
| 2006/0081594 A1 | 4/2006 | Popeil et al. |
| 2006/0081595 A1 | 4/2006 | Popeil et al. |
| 2006/0130918 A1 | 6/2006 | Kisiiug |
| 2006/0214025 A1 | 9/2006 | Kim |
| 2007/0028780 A1 | 2/2007 | Popeil et al. |
| 2007/0028781 A1 | 2/2007 | Popeil et al. |
| 2007/0034621 A1 | 2/2007 | Popeil et al. |
| 2007/0145061 A1 | 3/2007 | Backus et al. |
| 2007/0101585 A1 | 5/2007 | Popeil et al. |
| 2007/0186339 A1 | 8/2007 | Mattson et al. |
| 2007/0256571 A1 | 11/2007 | Popeil et al. |
| 2008/0250940 A1 | 2/2008 | Backus et al. |
| 2008/0075817 A1 | 3/2008 | Backus et al. |
| 2008/0092751 A1 | 4/2008 | Backus et al. |

(56) References Cited

U.S. PATENT DOCUMENTS

| | | |
|---|---|---|
| 2008/0163416 A1 | 7/2008 | Go |
| 2008/0265594 A1 | 7/2008 | Popeil et al. |
| 2009/0050209 A1 | 2/2009 | Rautavuori et al. |
| 2009/0173240 A1 | 3/2009 | Backus et al. |
| 2009/0090248 A1 | 4/2009 | Backus et al. |
| 2009/0191322 A1 | 4/2009 | Popeil et al. |
| 2009/0120303 A1 | 5/2009 | Popeil et al. |
| 2009/0178192 A1 | 7/2009 | Vassilev |
| 2009/0288483 A1 | 11/2009 | Varga et al. |
| 2009/0288720 A1 | 11/2009 | Krausse |
| 2010/0071565 A1 | 3/2010 | Backus et al. |
| 2010/0173050 A1 | 3/2010 | Backus et al. |
| 2010/0269712 A1 | 5/2010 | Popeil et al. |
| 2010/0141422 A1 | 6/2010 | Feinleib |
| 2010/0260910 A1 | 6/2010 | Backus et al. |
| 2010/0303973 A1 | 8/2010 | Popeil et al. |
| 2010/0299829 A1 | 12/2010 | Trujillo |
| 2011/0132891 A1 | 2/2011 | Backus et al. |
| 2011/0083565 A1 | 4/2011 | Backus |
| 2011/0083566 A1 | 4/2011 | Backus |
| 2011/0203570 A1 | 8/2011 | Popeil et al. |
| 2012/0167778 A1 | 7/2012 | Popeil et al. |
| 2013/0180415 A1 | 3/2013 | Backus |
| 2013/0199642 A1 | 8/2013 | Wang |
| 2014/0048142 A1 | 2/2014 | Gloodt |
| 2014/0227411 A1 | 4/2014 | Backus |
| 2014/0115773 A1 | 5/2014 | Wei |
| 2015/0101495 A1 | 4/2015 | Backus |
| 2016/0324358 A1 | 3/2016 | Backus |
| 2016/0106270 A1 | 4/2016 | Beuhring |
| 2016/0183709 A1 | 6/2016 | Backus |
| 2016/0345610 A1 | 12/2016 | Backus |
| 2017/0074584 A1 | 3/2017 | Backus |
| 2017/0208825 A1 | 7/2017 | Backus |
| 2017/0311757 A1 | 11/2017 | Backus et al. |
| 2018/0000285 A1 | 1/2018 | Backus |
| 2018/0000286 A1 | 1/2018 | Backus |
| 2018/0000287 A1 | 1/2018 | Backus |
| 2018/0049590 A1 | 2/2018 | Backus |
| 2018/0064147 A1 | 3/2018 | Backus |
| 2018/0071760 A1 | 3/2018 | Crawford |
| 2018/0192825 A1 | 7/2018 | Popeil et al. |
| 2018/0255955 A1 | 9/2018 | Backus |
| 2018/0264241 A1 | 9/2018 | Backus |
| 2018/0310775 A1 | 11/2018 | DeGraye et al. |
| 2019/0055723 A1 | 2/2019 | McAlpiue et al. |
| 2019/0060926 A1 | 2/2019 | Benitez |
| 2019/0093324 A1 | 3/2019 | Backus |
| 2019/0104890 A1 | 4/2019 | Braddock et al. |
| 2019/0142215 A1 | 5/2019 | Popeil et al. |
| 2019/0142218 A1 | 5/2019 | Popeil et al. |
| 2019/0167027 A1 | 6/2019 | Backus |
| 2019/0281869 A1 | 9/2019 | Backus |
| 2019/0328179 A1 | 10/2019 | Popeil |
| 2019/0374066 A1 | 12/2019 | Backus et al. |
| 2020/0000174 A1 | 1/2020 | Plance et al. |
| 2020/0008451 A1 | 1/2020 | Popeil |
| 2020/0068926 A1 | 3/2020 | Backus et al. |
| 2020/0178720 A1 | 6/2020 | Backus |
| 2020/0199855 A1 | 6/2020 | Backus |
| 2020/0214500 A1 | 7/2020 | Popeil et al. |
| 2020/0229650 A1 | 7/2020 | Backus |
| 2020/0268024 A1 | 8/2020 | Backus et al. |
| 2020/0305645 A1 | 10/2020 | Backus |
| 2020/0329912 A1 | 10/2020 | Backus |

* cited by examiner

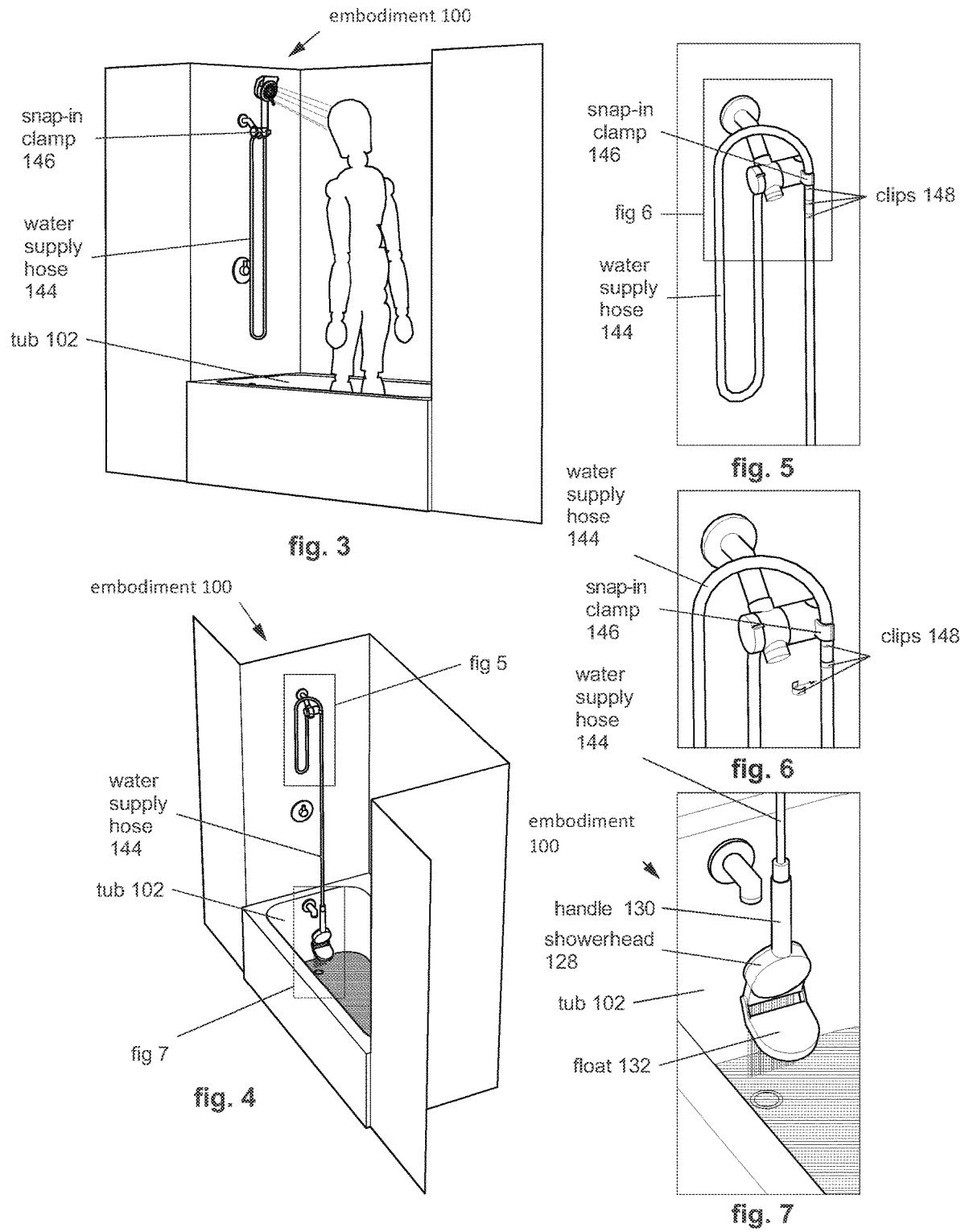

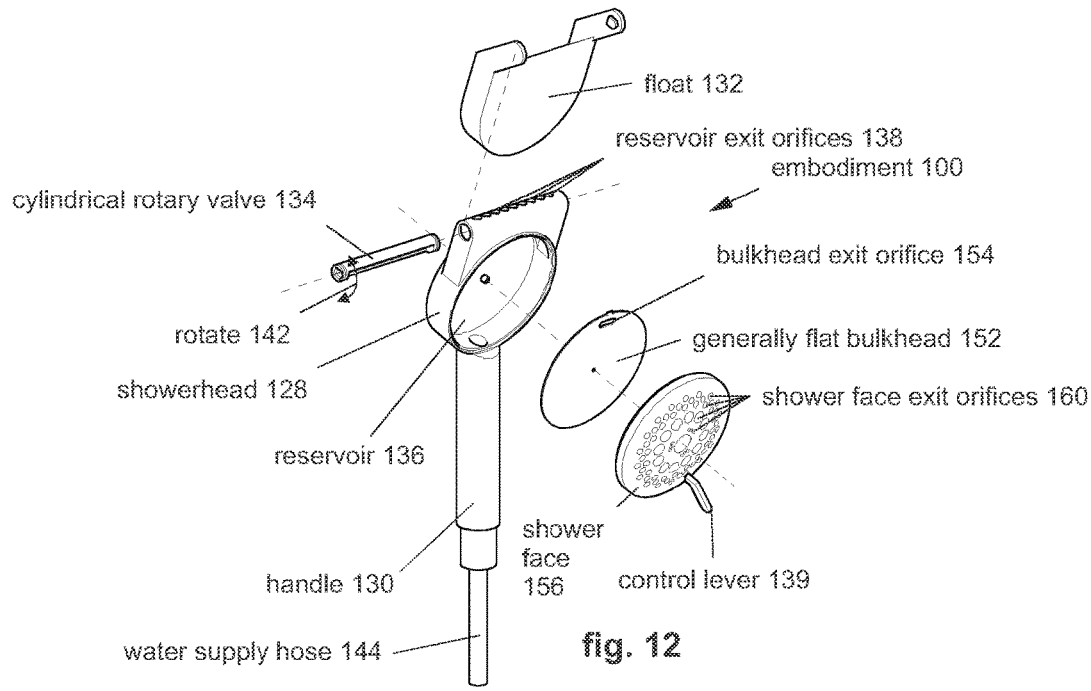
fig. 12
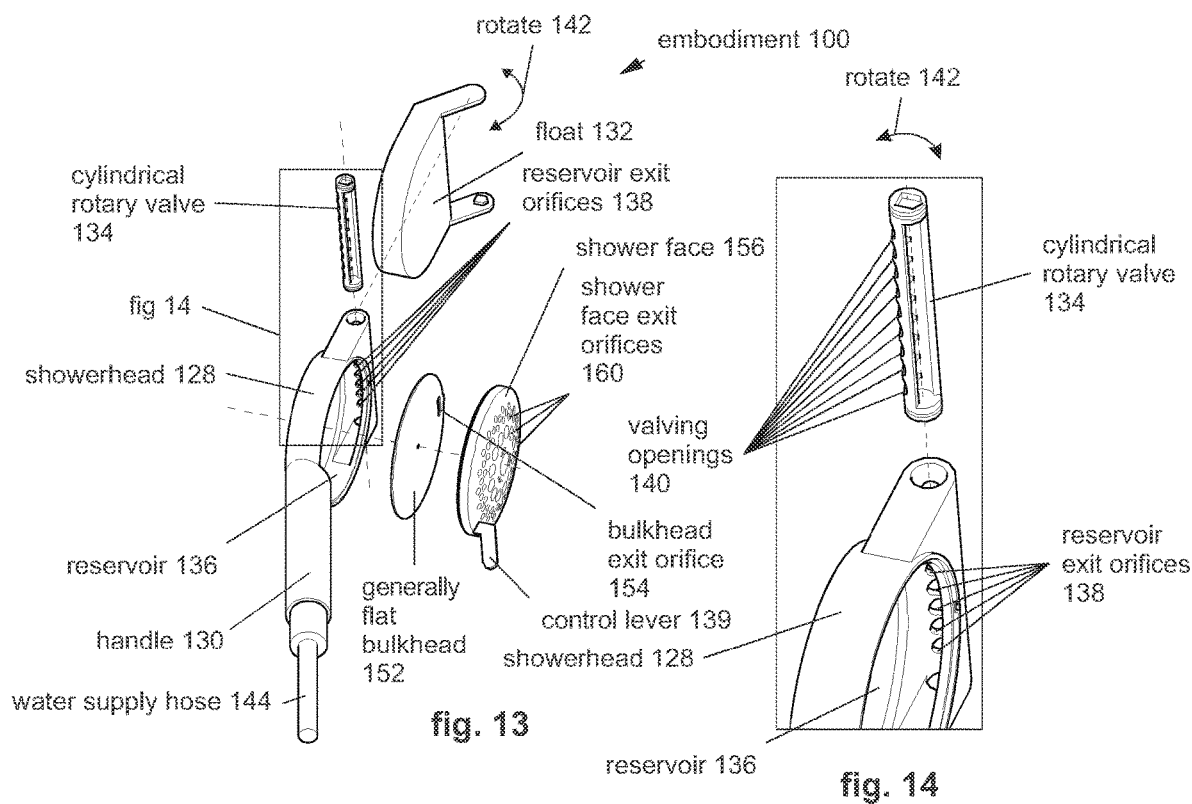
fig. 13
fig. 14

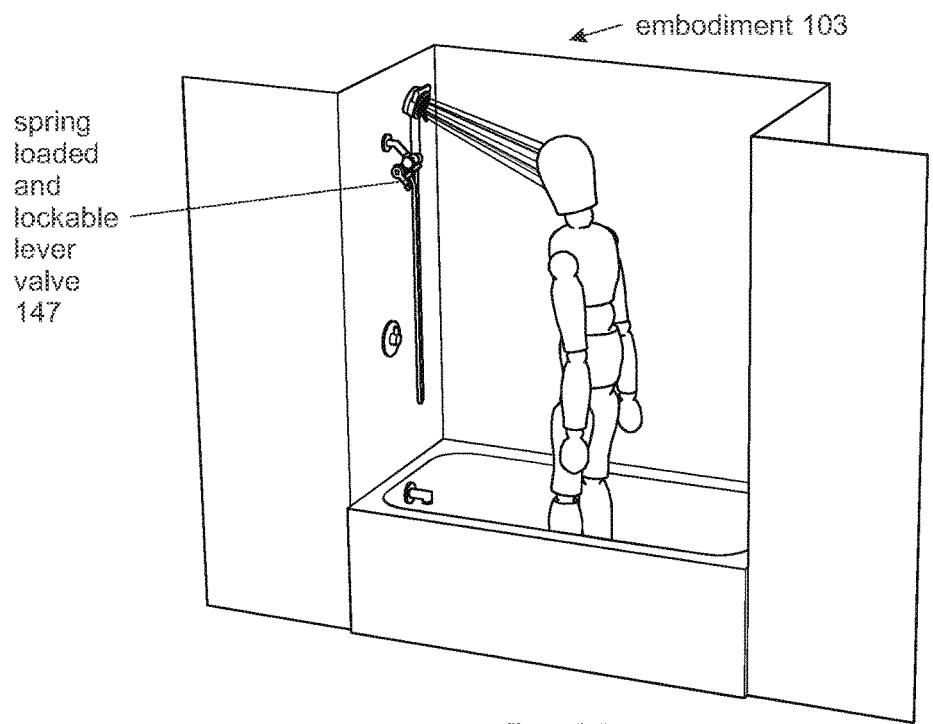
fig. 15
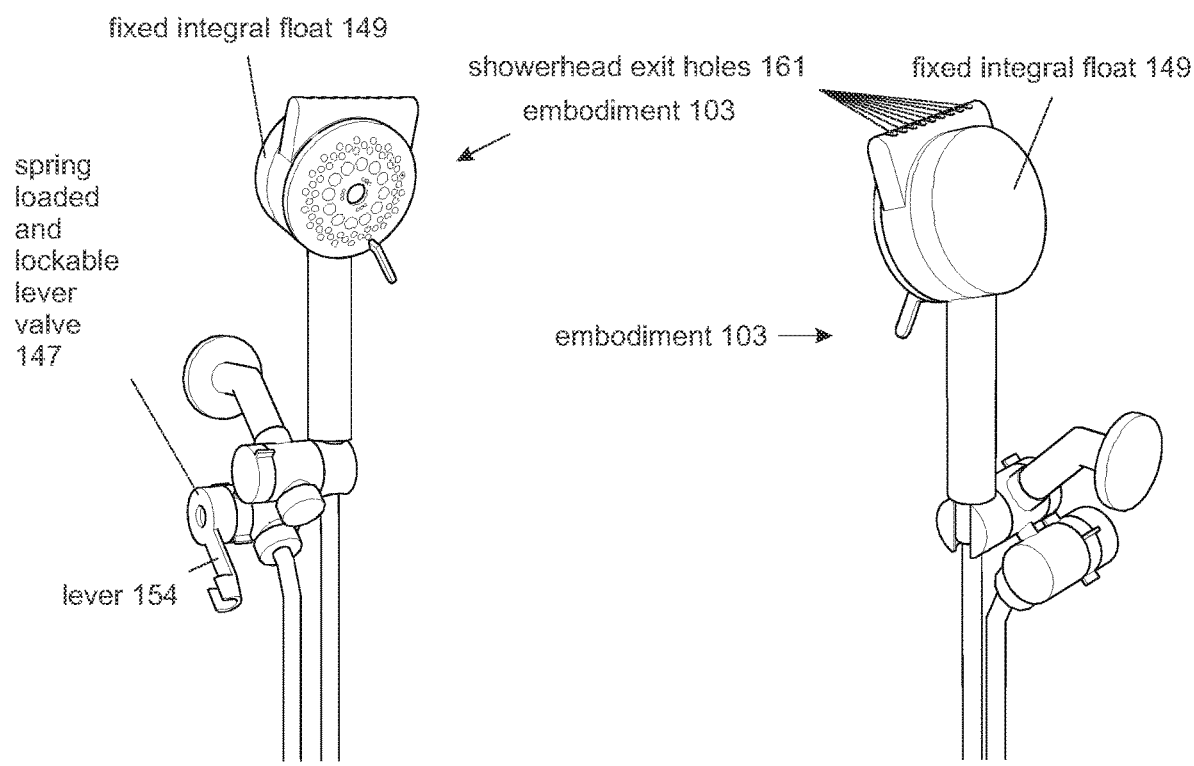
fig. 16
fig. 17

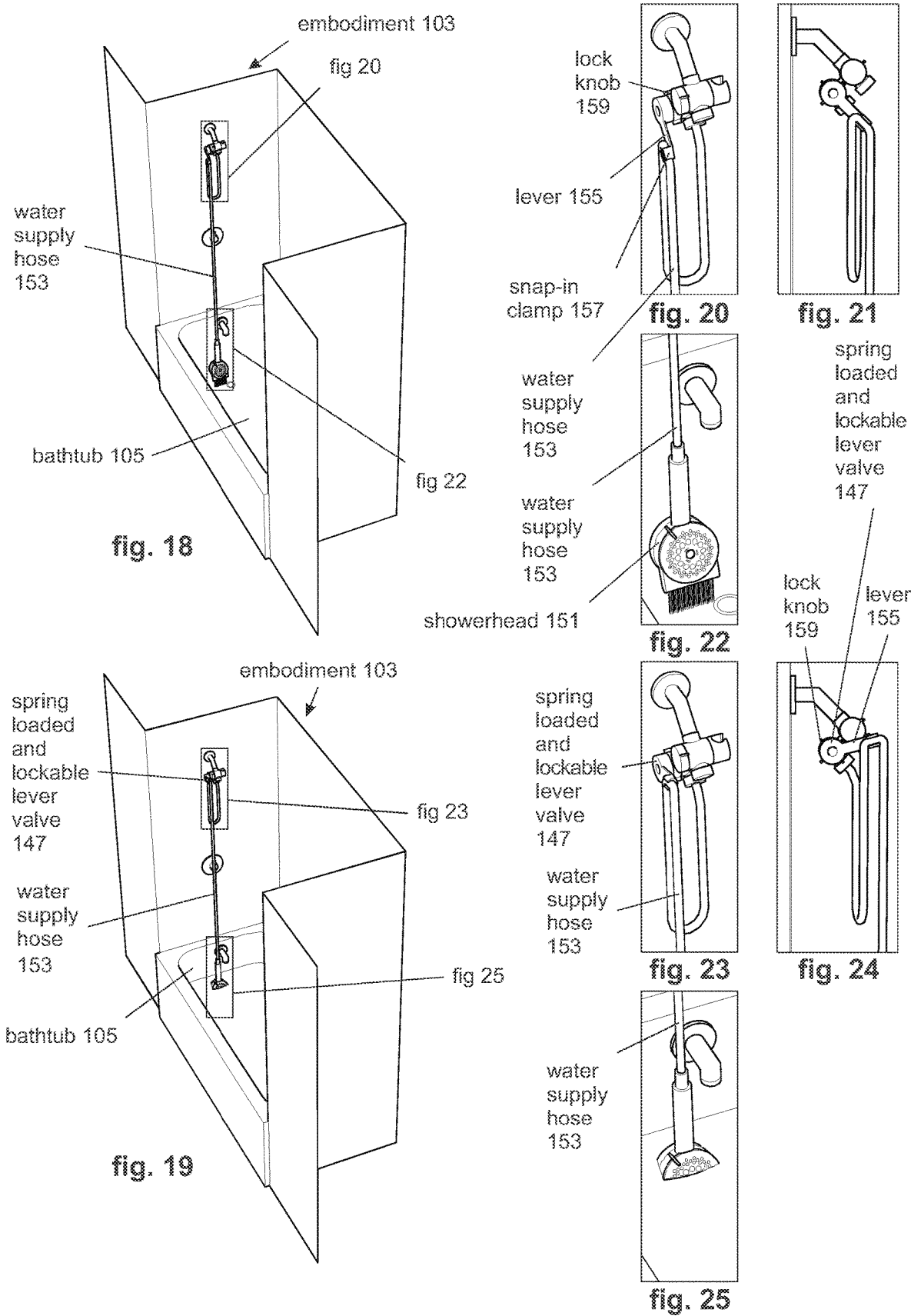

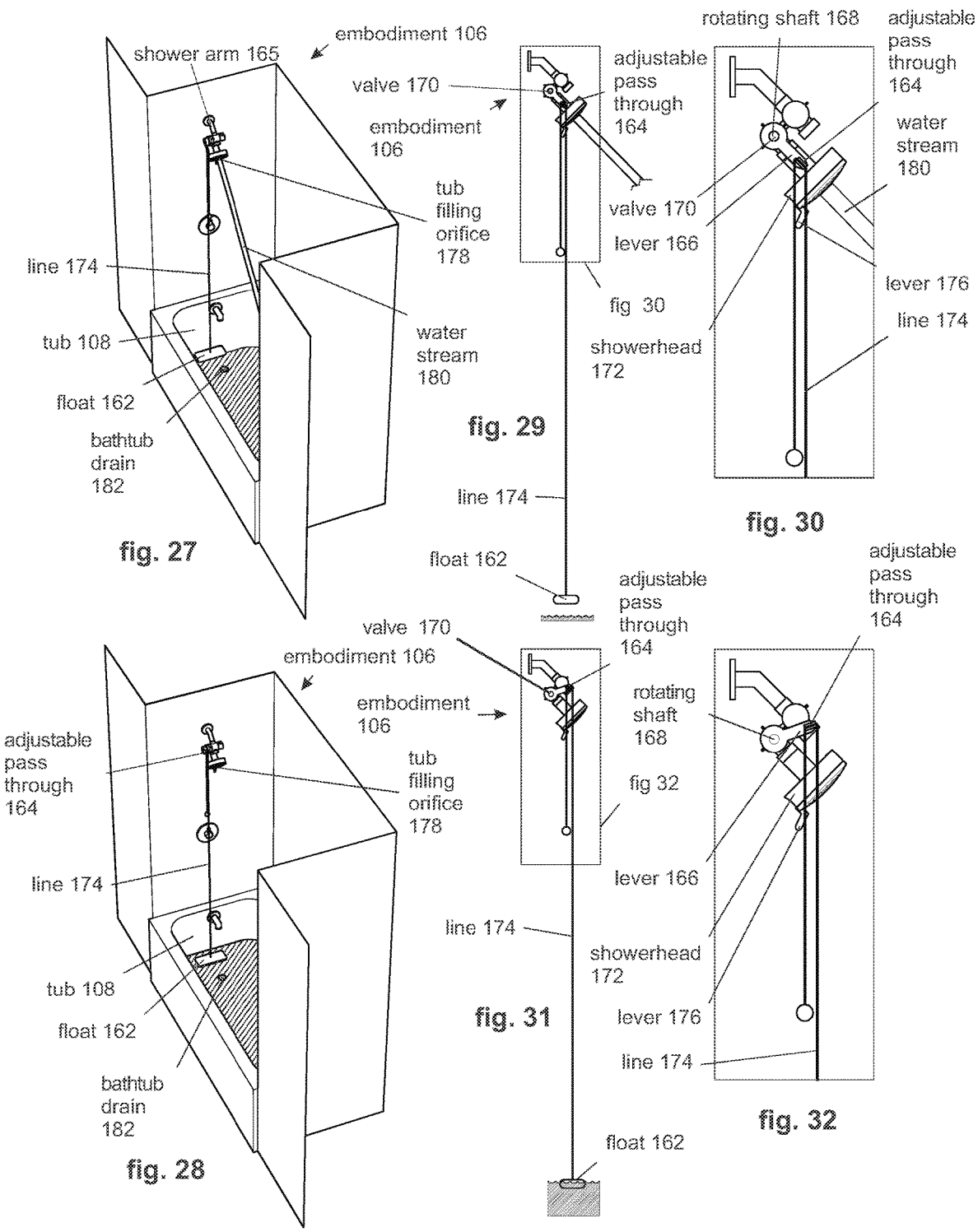

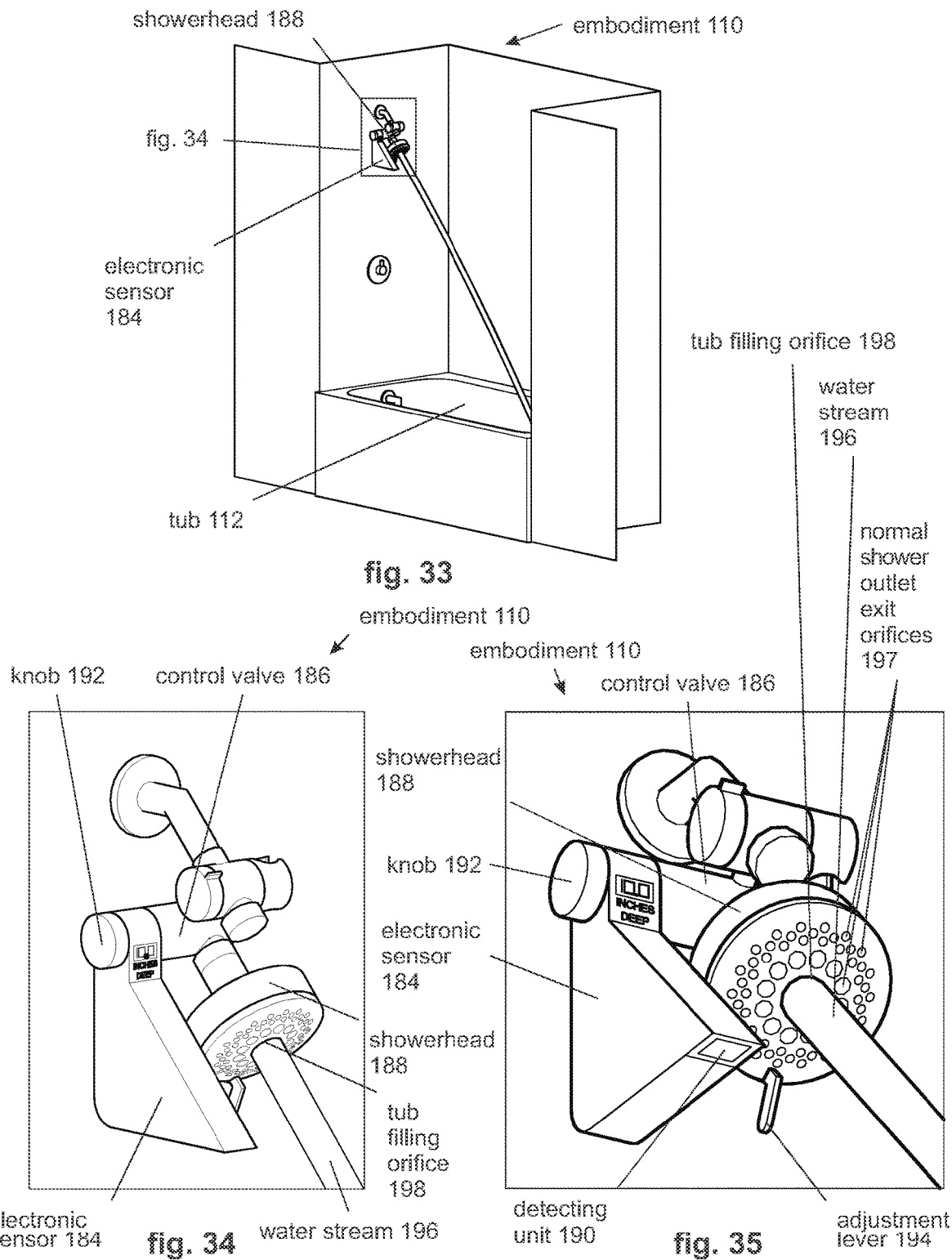

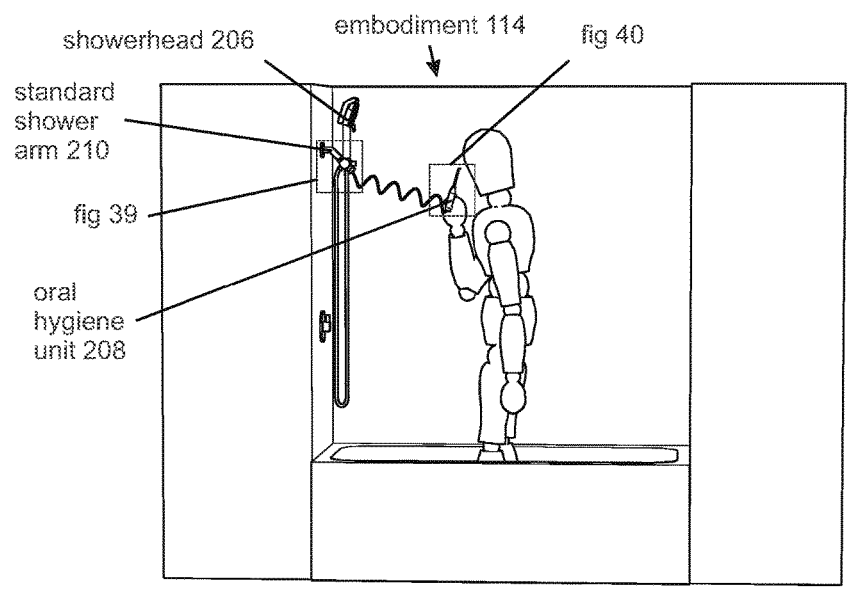
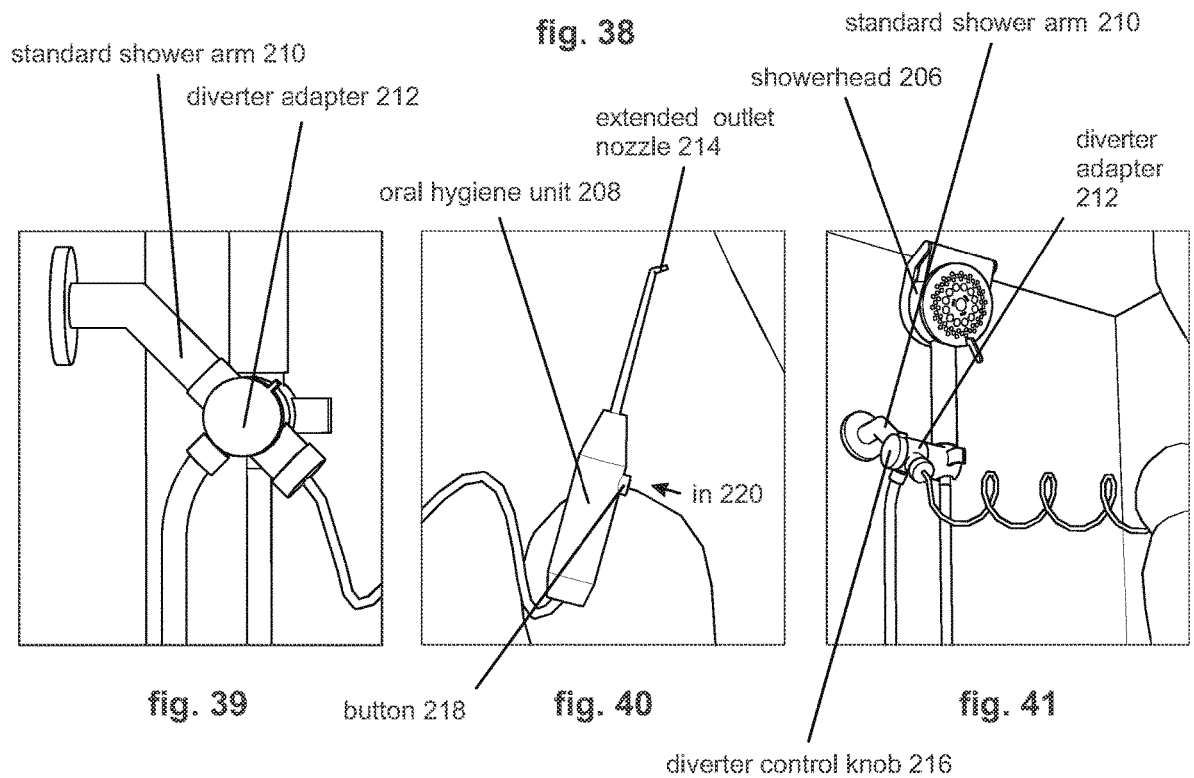

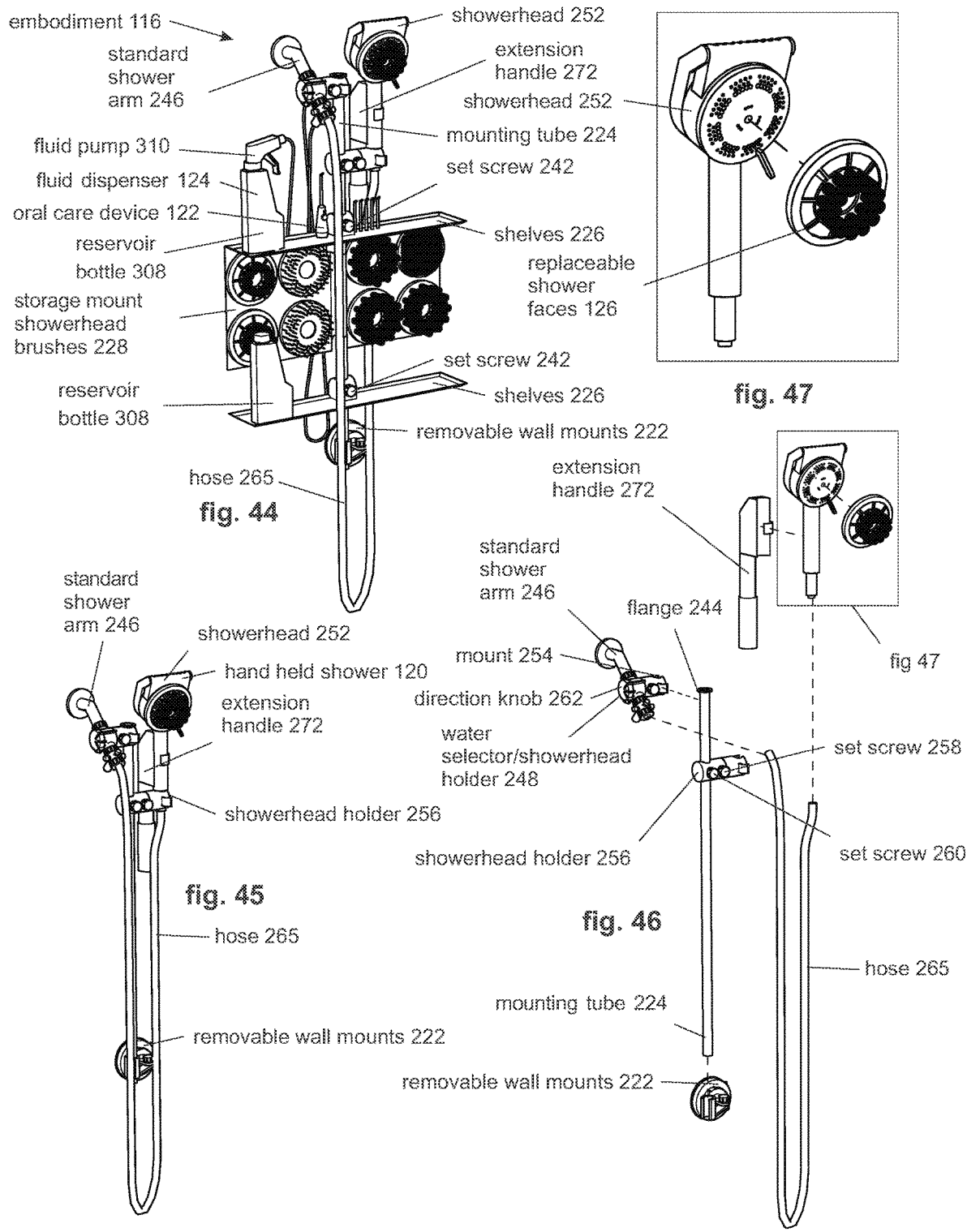

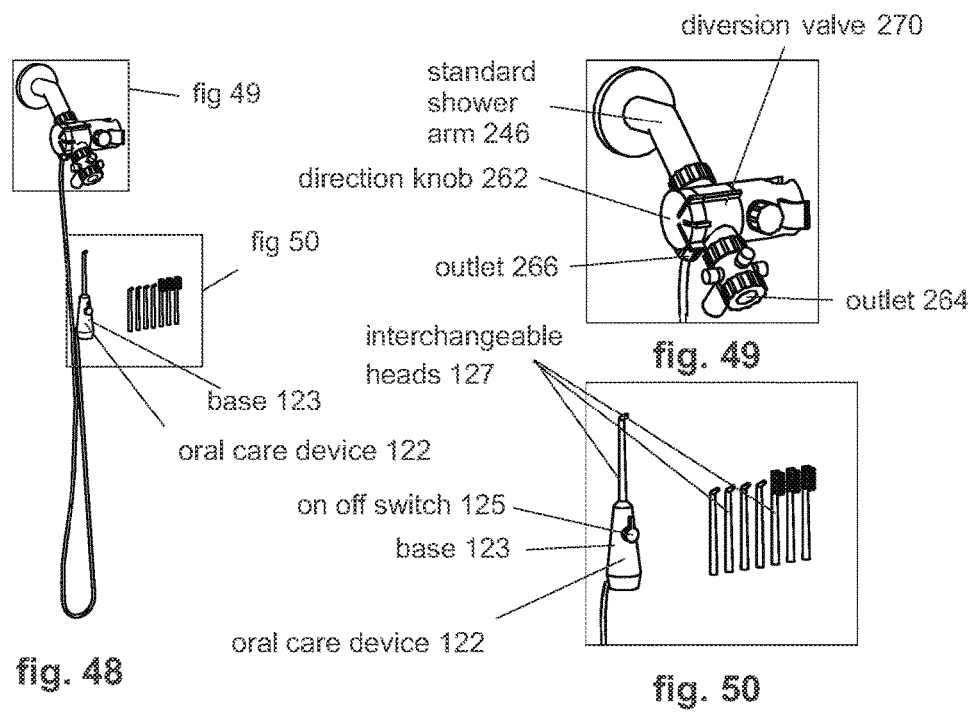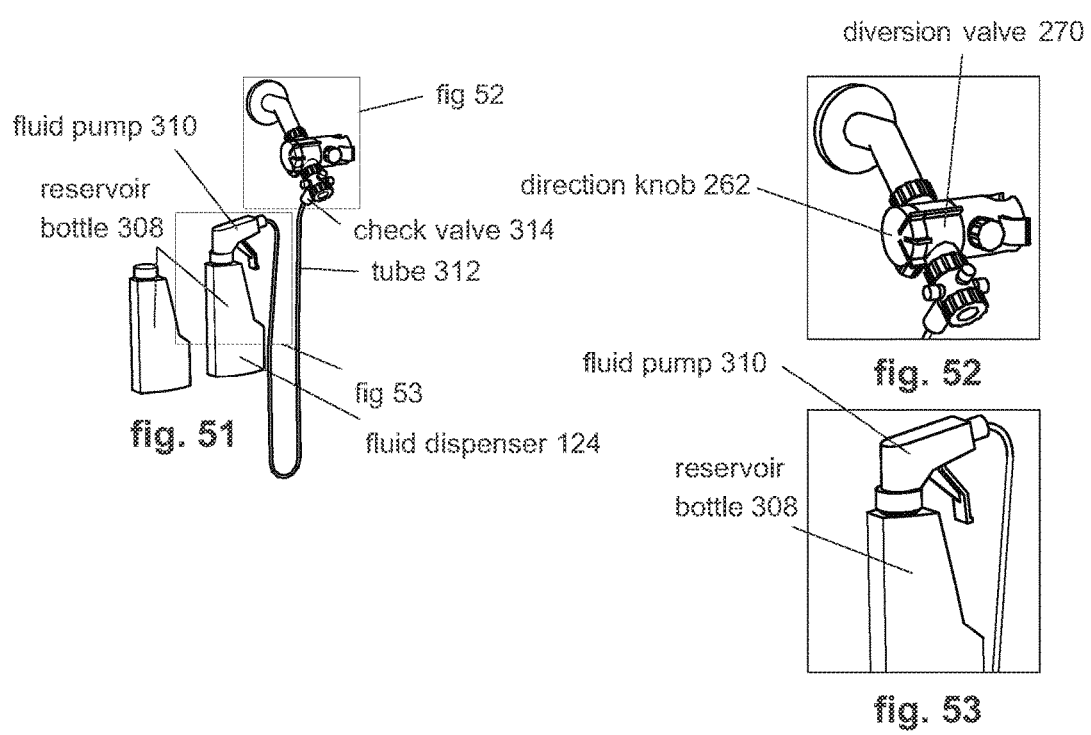

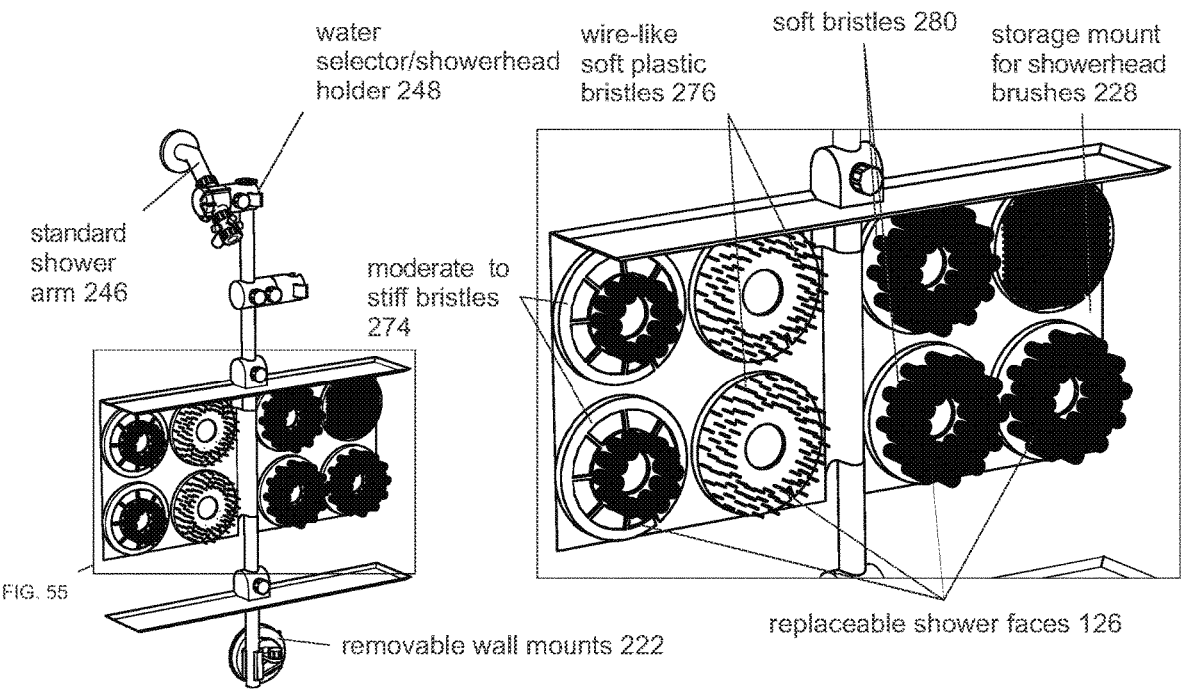
fig. 54   fig. 55
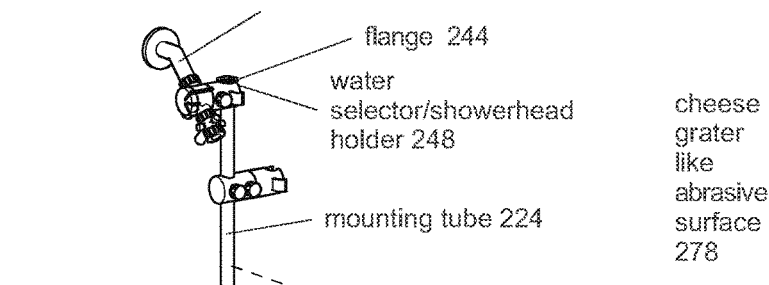 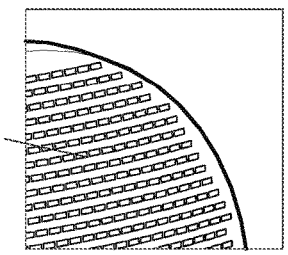
fig. 57
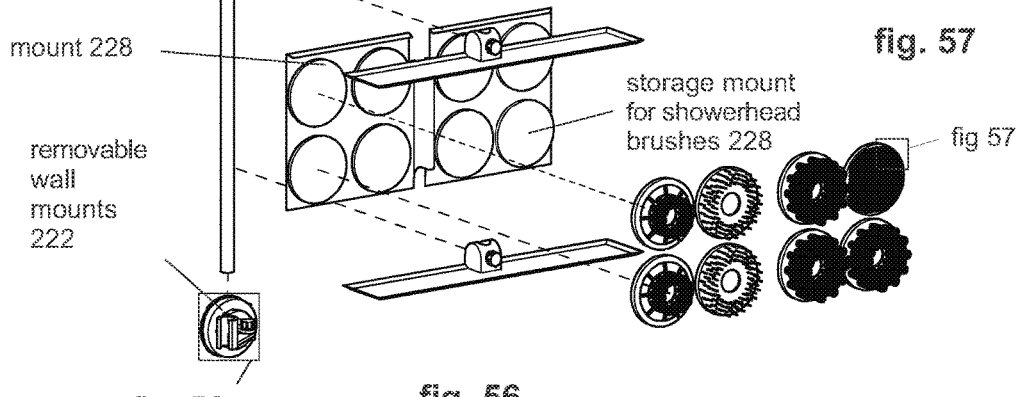
fig. 58   fig. 56

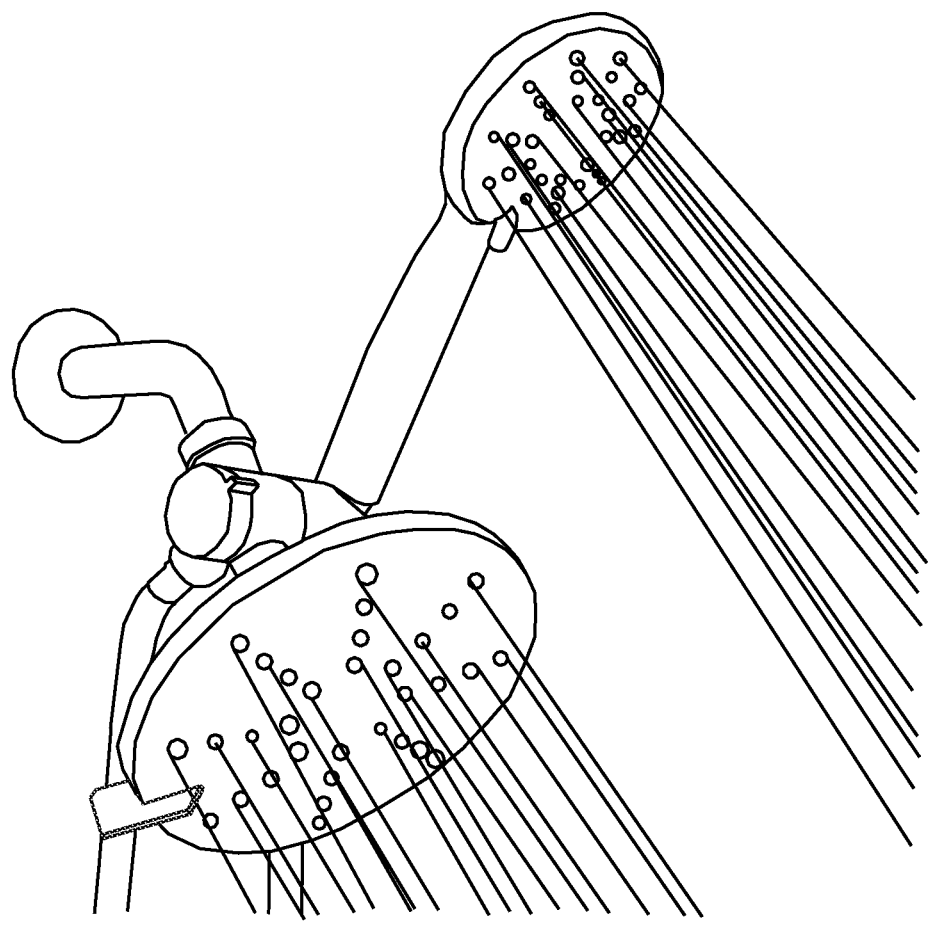
fig. 61 - prior art

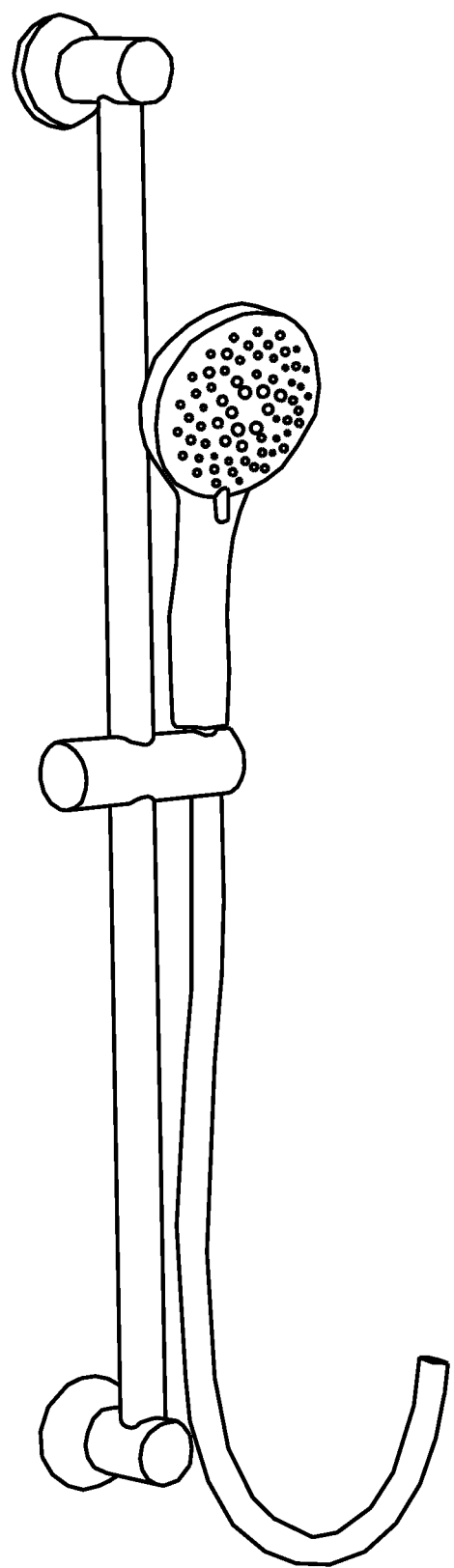
fig. 62 - prior art

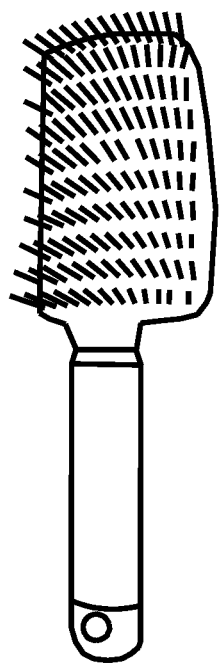
fig. 63 - prior art
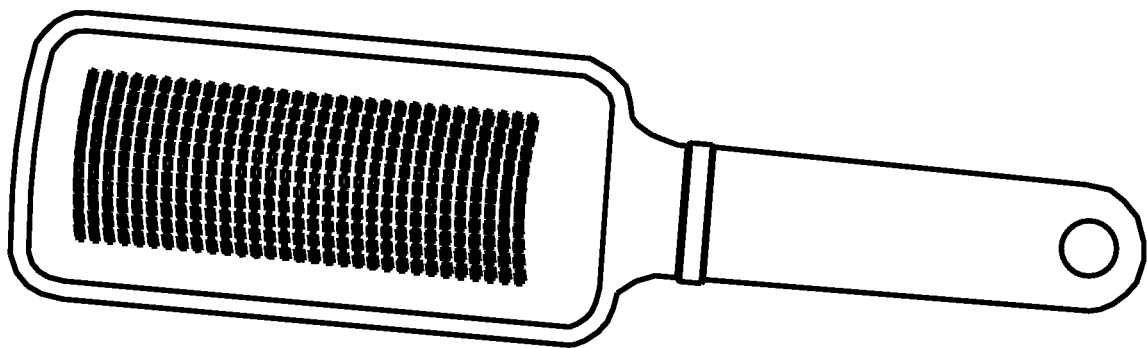
fig. 64 - prior art

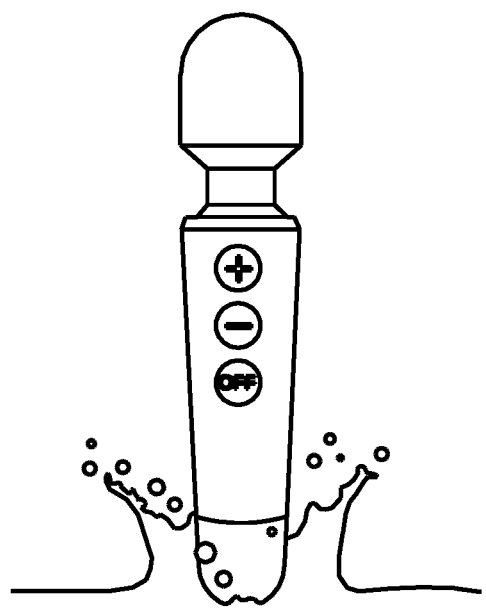
fig. 65 - prior art

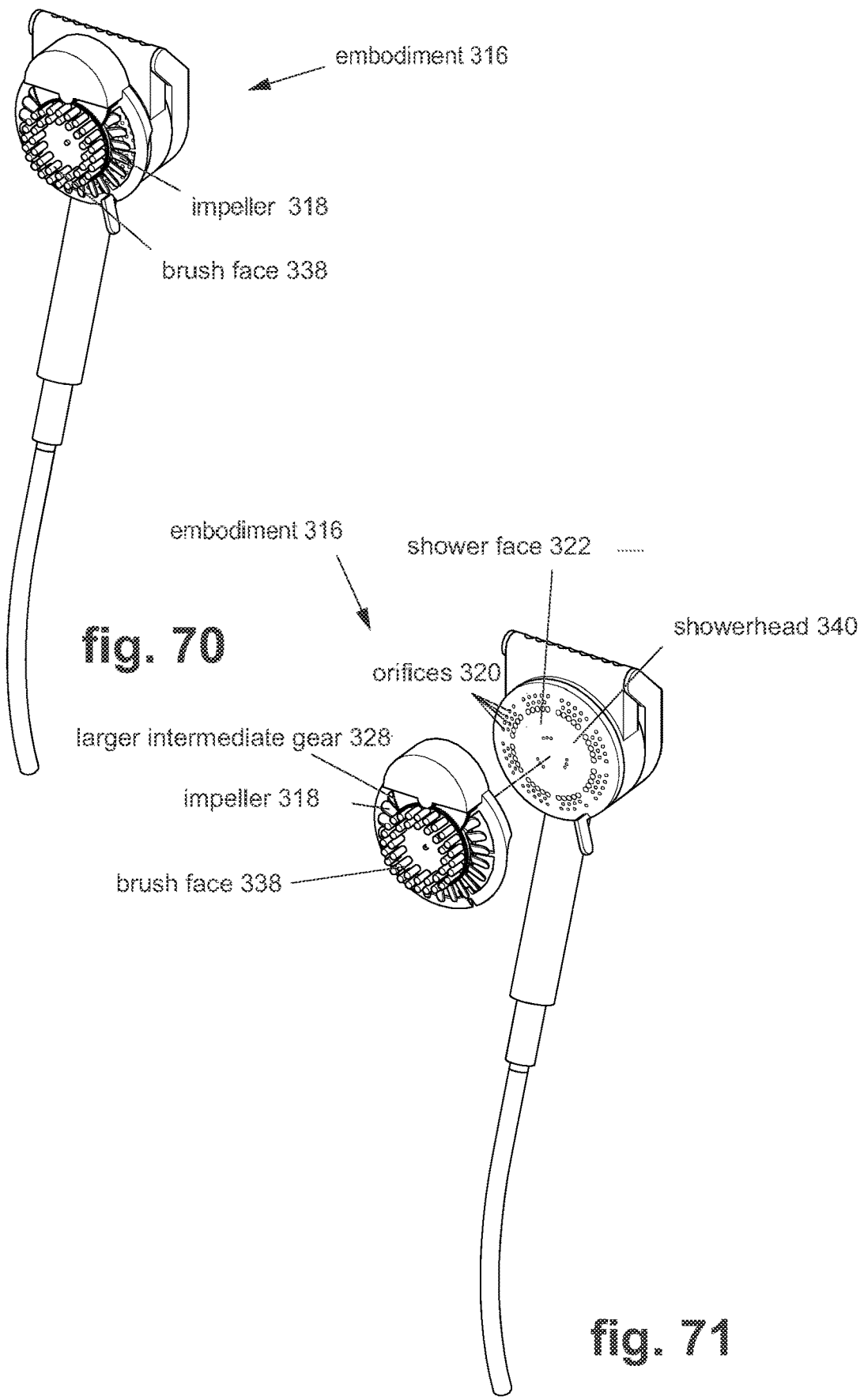

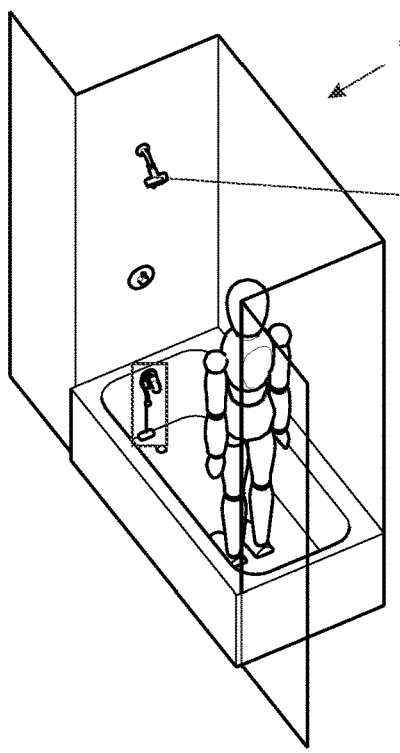
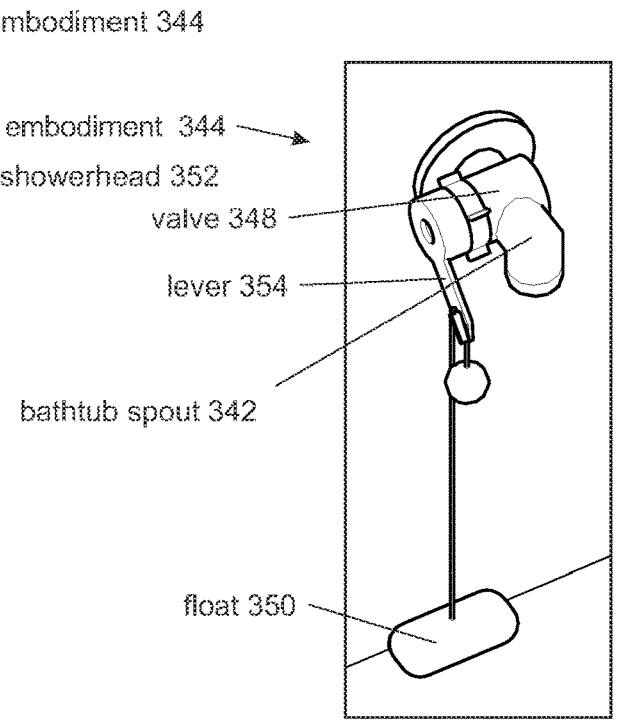
fig. 76
fig. 77
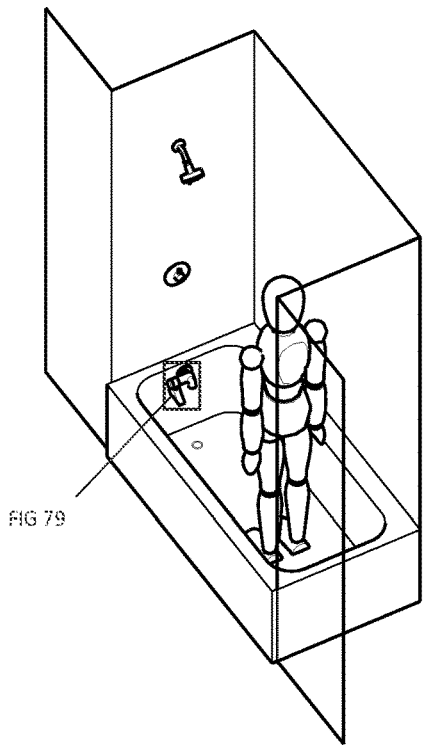
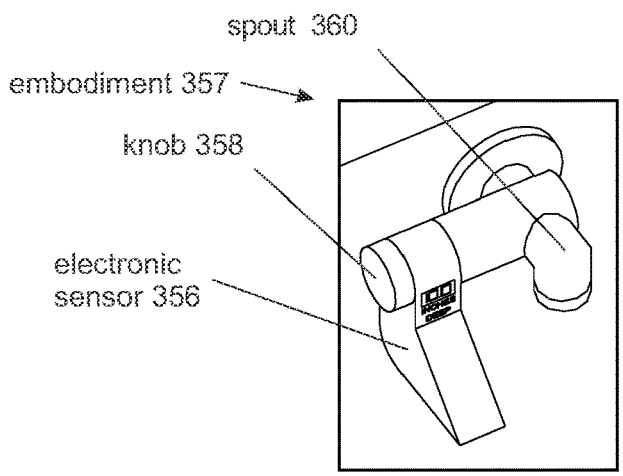
fig. 78
fig. 79

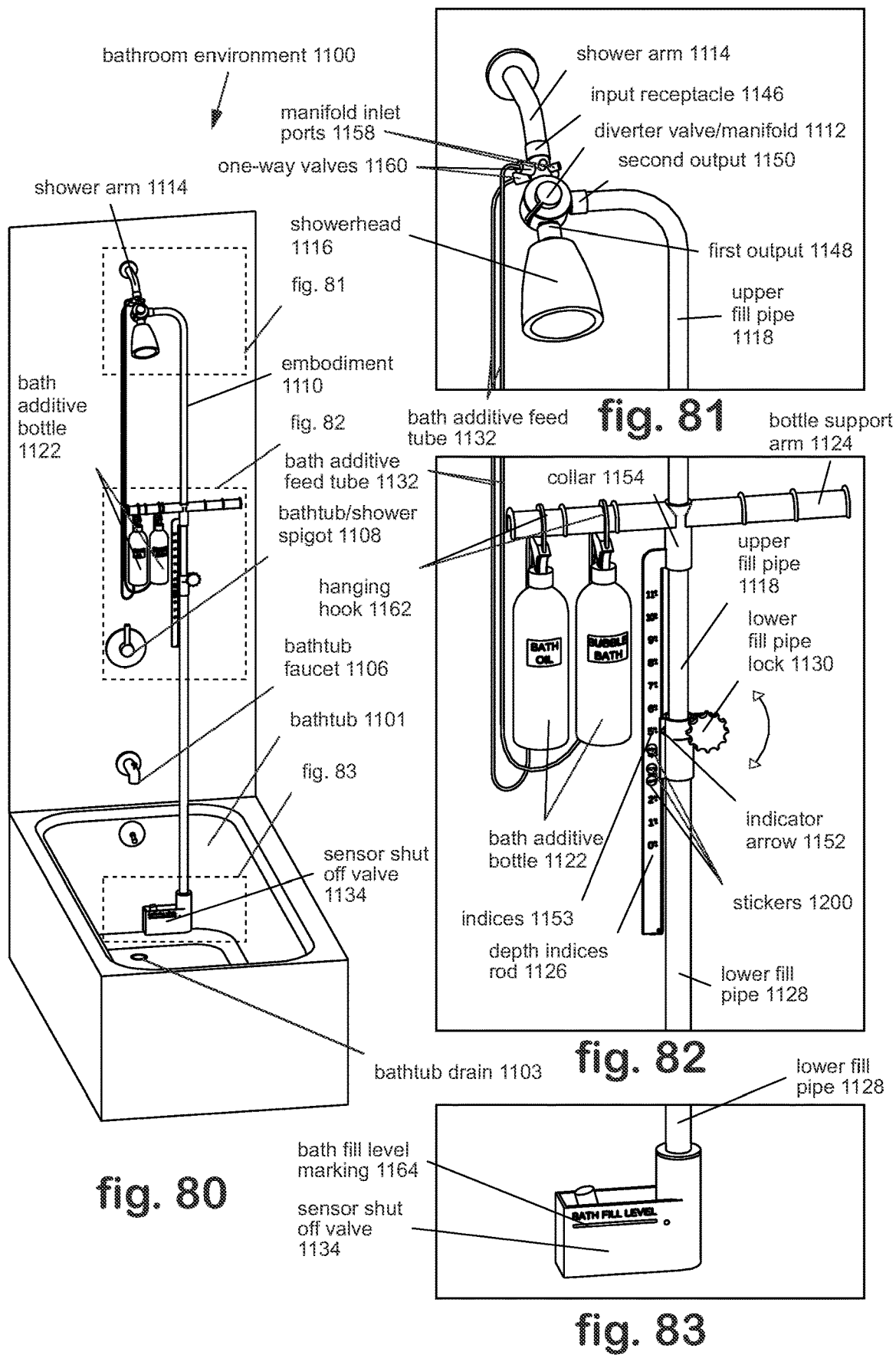

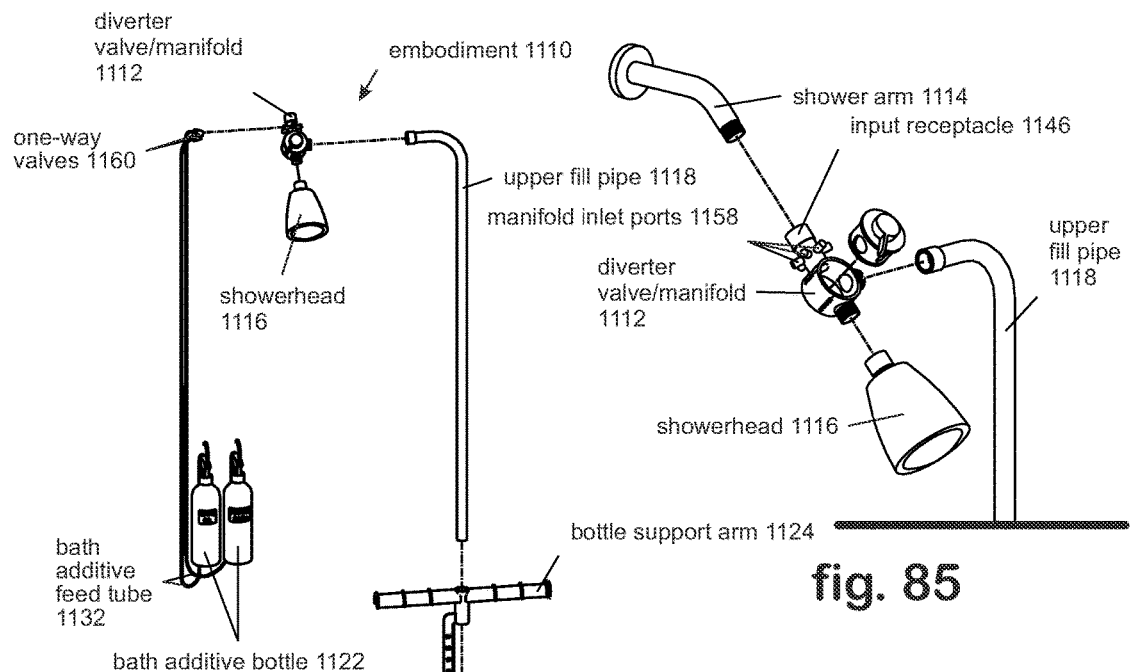
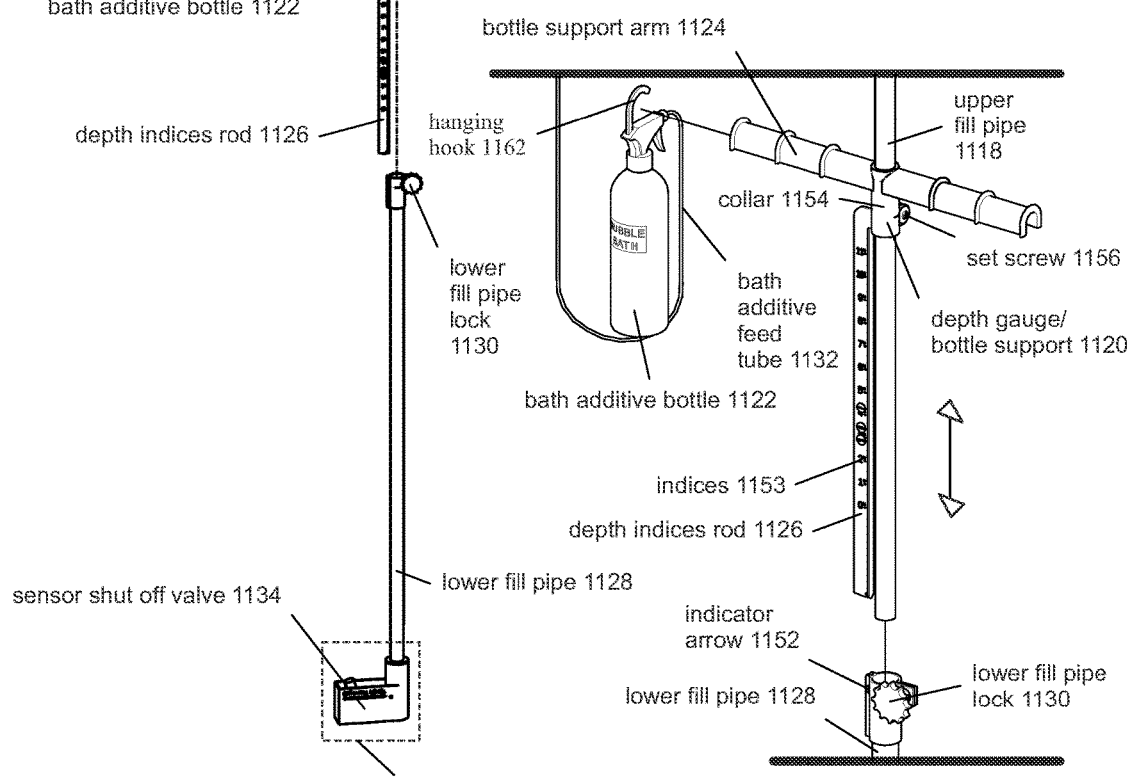

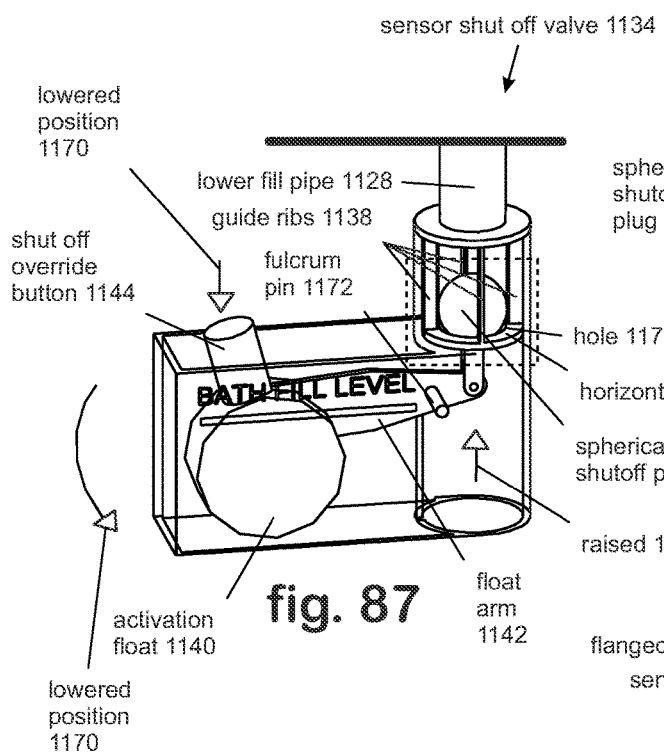
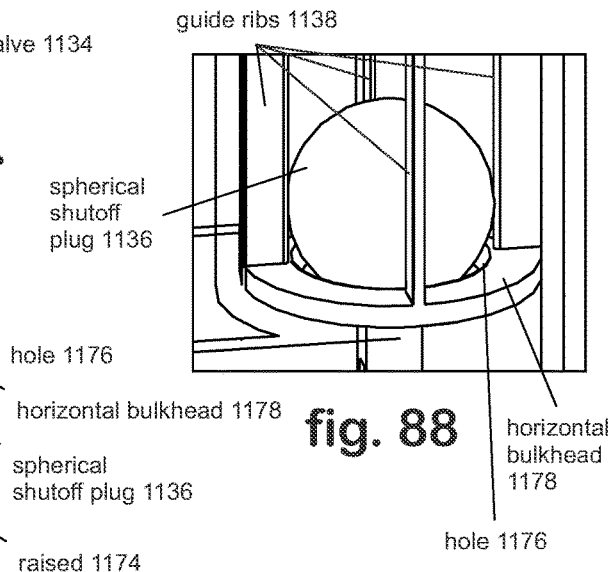
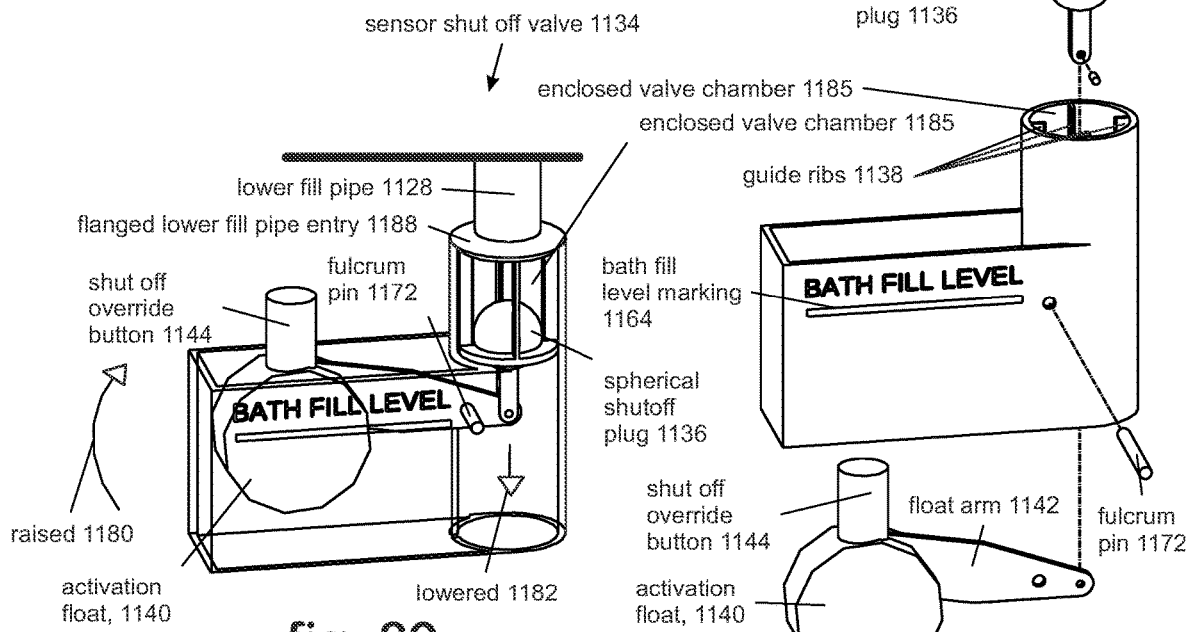

SYSTEM AND METHOD FOR FLUID HANDLING IN A SHOWER OR BATH

TECHNICAL FIELD

The present application is related to bathing devices in general, and more particularly to those related to showers and baths.

BACKGROUND

Bathing and bathing devices date back to at least man's earliest history. Today, there are all manner of bathtubs, showerheads, and devices designed to dispense water for cleansing. As easy, convenient, and versatile as these devices are, there is still a need to make them easier, more convenient, and with increased versatility.

As an example, in order to take a bath, it is common to turn on the water, and then come back at periodic intervals to turn it off at the proper moment. As another example, application of lotions, including skin moisturizers, shampoos, hair conditioners, and the like, is commonly done by direct hand or other application.

It would be advantageous to make these and other bathing related functions simpler and more convenient.

BRIEF DESCRIPTION OF THE DRAWINGS

Various embodiments will become better understood with regard to the following description, appended claims and accompanying drawings wherein:

FIG. 3 is a perspective of embodiment 100 in use during showering.
FIG. 4 is a perspective of embodiment 100 and use while tub 102 is being filled.
FIG. 5 is a detail of FIG. 4, as indicated in FIG. 4.
FIG. 6 is a detail of FIG. 5, as indicated in FIG. 5.
FIG. 7 is a detail of FIG. 4, as indicated in FIG. 4.
FIG. 12 is an exploded perspective of embodiment 100.
FIG. 13 is an exploded perspective of embodiment 100 taken from below.
FIG. 14 is a detail of FIG. 13, as indicated in FIG. 13.
FIG. 15 is a perspective of embodiment 103 when it is being used as a wall-mounted shower.
FIG. 16 is a forward perspective view of embodiment 103.
FIG. 17 is a rearward perspective view of embodiment 103.
FIG. 18 is a perspective view of embodiment 103 while it is filling bathtub 105.
FIG. 19 is a perspective view of embodiment 103 after it has filled bathtub 105.
FIG. 20 is a detail FIG. 18, as indicated in FIG. 18.
FIG. 21 is a profile of FIG. 20.
FIG. 22 is a detail of FIG. 18, as indicated in FIG. 18.
FIG. 23 is a detail of FIG. 19, as indicated in FIG. 19.
FIG. 24 is a profile of FIG. 23.
FIG. 25 is a detail of FIG. 19, as indicated in FIG. 19.
FIG. 27 is a perspective of embodiment 106, while it is filling tub 108.
FIG. 28 is a perspective view of embodiment 106, after it has filled tub 108.
FIG. 29 is a profile view of embodiment 106 in the condition shown in FIG. 27.
FIG. 30 is a detail of FIG. 29, as indicated in FIG. 29.
FIG. 31 is a profile view of embodiment 106 in the condition shown in FIG. 28.
FIG. 32 is a detail of FIG. 31, as indicated in FIG. 31.
FIG. 33 is a perspective of embodiment 110 while in use filling tub 112.
FIG. 34 is a detail of FIG. 33, as indicated in FIG. 33.
FIG. 35 is an upward looking perspective of embodiment 110.
FIG. 38 is a perspective of embodiment 114 in use.
FIG. 39 is a detail of FIG. 38, as indicated in FIG. 38.
FIG. 40 is a detail of FIG. 38, as indicated in FIG. 38.
FIG. 41 is an upward looking perspective view of embodiment 114 in the condition of FIG. 38.
FIG. 44 is a perspective of embodiment 116.
FIG. 45 is a perspective which shows just the portions of embodiment 116 which are related to hand held shower 120.
FIG. 46 is an exploded perspective of FIG. 45.
FIG. 47 is a detail of FIG. 46, as indicated in FIG. 46.
FIG. 48 is a perspective which shows just the portions of embodiment 116 which are related to oral care device 122.
FIG. 49 is a detail of FIG. 48, as indicated in FIG. 48.
FIG. 50 is a detail of FIG. 48, as indicated in FIG. 48.
FIG. 51 is a perspective which shows just the portions of embodiment 116 which are related to fluid dispenser 124.
FIG. 52 is a detail of FIG. 51, as indicated in FIG. 51.
FIG. 53 is a detail of FIG. 51, as indicated in FIG. 51.
FIG. 54 is a perspective which shows just the portions of embodiment 116 which are related to replaceable shower faces 126.
FIG. 55 is a detail of FIG. 54, as indicated in FIG. 54.
FIG. 56 is an exploded perspective view of FIG. 54.
FIG. 57 is a detail of FIG. 56, as indicated in FIG. 56.
FIG. 61 is a screenshot of a webpage on amazon.com.
FIG. 62 is a screenshot of a webpage on amazon.com.
FIG. 63 is a screenshot of a hair care product.
FIG. 64 is a screenshot of a callous removal product.
FIG. 65 is a screenshot of a waterproof battery-operated vibrator.
FIG. 70 is a perspective of embodiment 316.
FIG. 71 is a partially exploded perspective of embodiment 316.

FIG. 76 is a perspective of embodiment 344.

FIG. 77 is a detail of FIG. 76, as indicated in FIG. 76.

FIG. 78 is a perspective of embodiment 357.

FIG. 79 is a detail of FIG. 78, as indicated in FIG. 78.

FIG. 80 is a perspective of an embodiment of present inventions in a bathroom environment 1100, including bathtub 1101, bathtub drain 1103, bathtub faucet 1106, and bathtub/shower spigot 1108.

FIG. 81 is a detail of FIG. 80, as indicated in FIG. 80.

FIG. 82 is a detail of FIG. 80, as indicated in FIG. 80.

FIG. 83 is a detail of FIG. 80, as indicated in FIG. 80.

FIG. 84 is an exploded perspective view of embodiment 1110.

FIG. 85 is an exploded perspective of diverter valve/manifold 1112, including shower arm 1114, showerhead 1116, and upper fill pipe 1118.

FIG. 86 is an exploded perspective of depth gauge/bottle support 1120, including: bath additive bottle 1122, bottle support arm 1124, depth indices rod 1126, lower fill pipe 1128, lower fill pipe lock 1130, and bath additive feed tube 1132.

FIG. 87 is a transparent perspective of sensor shut off valve 1134 in its open disposition, including: spherical shutoff plug 1136, guide ribs 1138, activation float 1140, float arm 1142, and shut off override button 1144.

FIG. 88 is a detail of FIG. 87, as indicated in FIG. 87.

FIG. 89 is identical to FIG. 87 except sensor shut off valve 1134 is in its closed disposition.

FIG. 90 is an exploded perspective of shutoff valve 1134.

DETAILED DESCRIPTION

Figure 1:
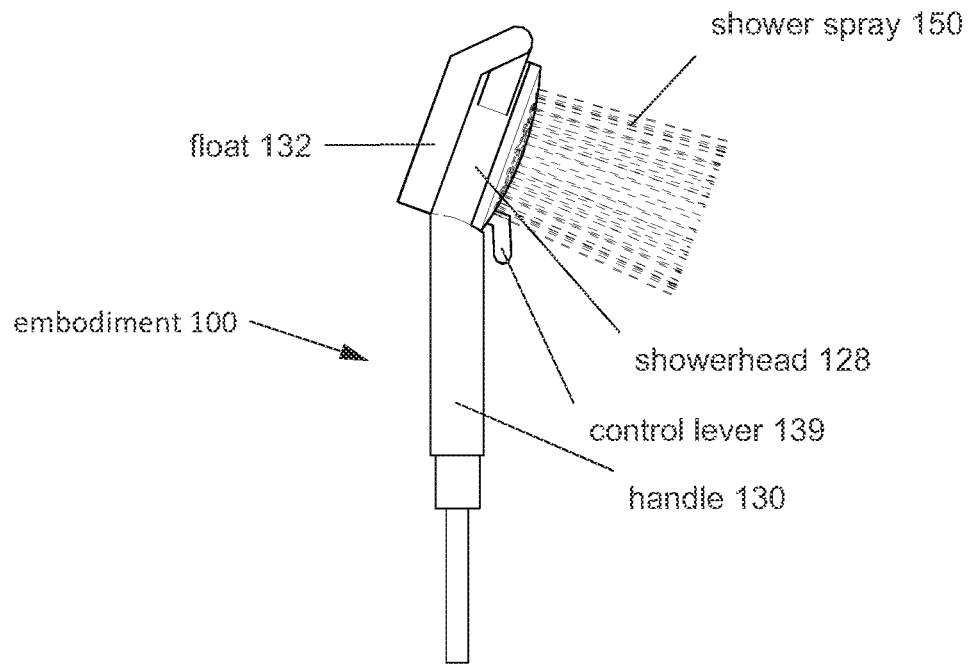
FIG. 1 is a profile of embodiment 100.

Embodiment 100, FIGS. 1 Through 14:

Referring to FIGS. 1 through 14, embodiment 100 is generally comprised of showerhead 128, which is integral with handle 130, and is pivotably attached to float 132, which in turn is fixedly attached to cylindrical rotary valve 134 (see especially FIGS. 12, 13, and 14). Showerhead 128 may be of any suitable construction, including, but not limited to, constructions currently on the market (see FIGS. 58 and 59 for some examples).

As a general non-limiting and non-exhaustive example, many of these currently marketed devices have a tubular handle, which at one end is connected to a hose which supplies water, and the tubular handle being integral on its other end with a water reservoir disposed behind a hand rotated shower face which, on its generally flat rear face has one or a plurality of ports, each port being connected to outlet orifices penetrating through the forward surface of the hand rotated shower face.

The forward portion of the water reservoir being covered by a generally flat bulkhead which includes one or more reservoir outlet orifices which align with the plurality of ports on the rear generally flat face of the hand rotated shower face. As the hand rotated shower face is rotated, water is channeled through different ports out of the plurality of ports on the generally flat rear face of the rotating shower face, resulting in water exiting through different outlet orifices in the forward surface of the hand rotated shower face, resulting in various spray patterns (i.e. heavy rain, light rain, mist, etc.)

Many currently marketed showerheads also have one or more rotating waterwheel elements located inside of the hand rotated shower face, which, under water flow power, interrupts the continuous flow of water through the hand rotated shower face, and, at certain shower face rotational settings, result in a pulsating, massaging and/or rotational spray effects. Such constructions, as well as other suitable constructions (see FIGS. 61 and 62 as non-limiting and non-exhaustive examples), might be used to build embodiments herein, including, but not limited to, embodiment 100.

Referring especially to FIGS. 12, 13, and 14; embodiment 100 further includes cylindrical rotary valve 134 which controls water outflow from reservoir 136 through reservoir exit orifices 138. Specifically, cylindrical rotary valve 134 includes valve openings 140 which rotate 142 in and out of alignment with reservoir exit orifices 138. Such alignments and misalignments result in respectively water flow through reservoir exit orifices 138 being allowed, or being prevented.

Rotational 142 disposition of cylindrical rotary valve 134 is controlled by the rotational 142 position of float 132 which is fixedly attached to cylindrical rotary valve 134. When float 132 is resting directly behind, and face-to-face with the back of reservoir 136, as in FIGS. 1 and 2, water is prevented from outflowing from reservoir 136. When float 132 is open and away from the back of reservoir 136, as shown in FIGS. 4, 7, 8 and 9, water is allowed to exit through exit orifices 138.

Figure 2:
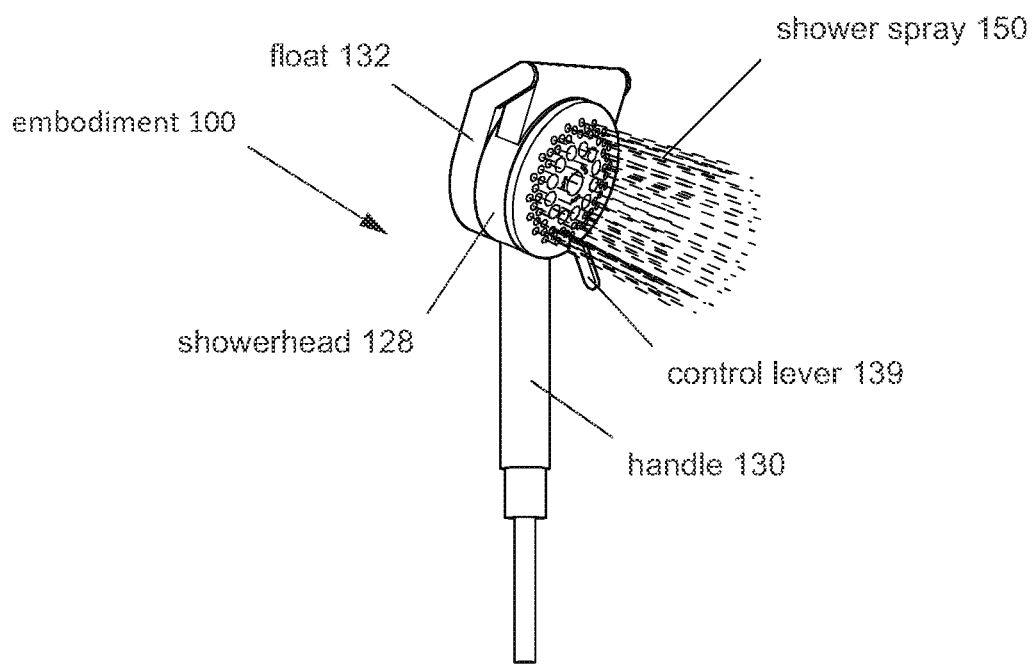
FIG. 2 is a perspective of embodiment 100.
Figure 8:
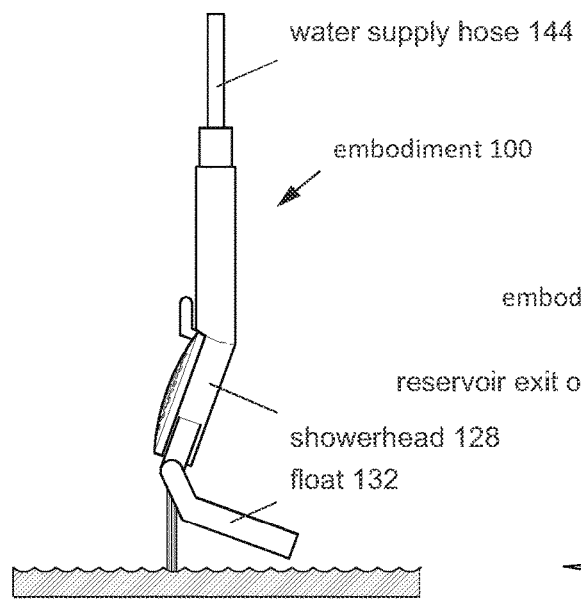
FIG. 8 is a profile of embodiment 100 in use while filling a bathtub.
Figure 9:
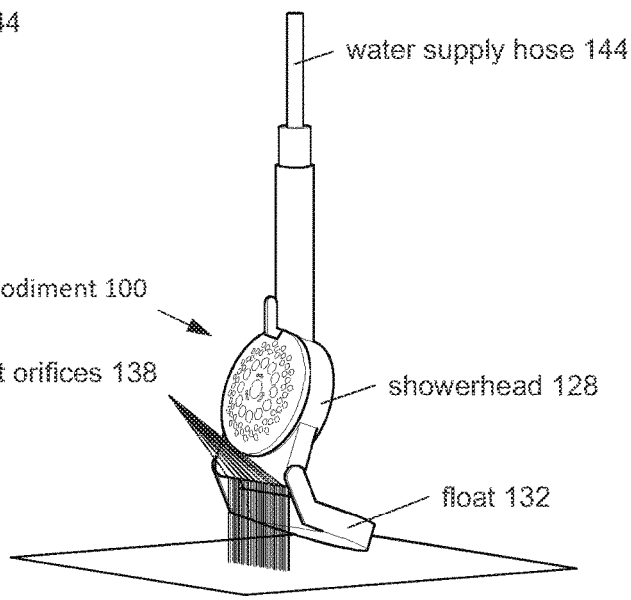
FIG. 9 is a perspective of embodiment 100 in use while filling a bathtub.

In use, embodiment 100 may be used as a conventional showerhead (see at least FIG. 3), with float 132 face-to-face with the back of reservoir 136, as shown at least in FIGS. 1 and 2.

Figure 10:
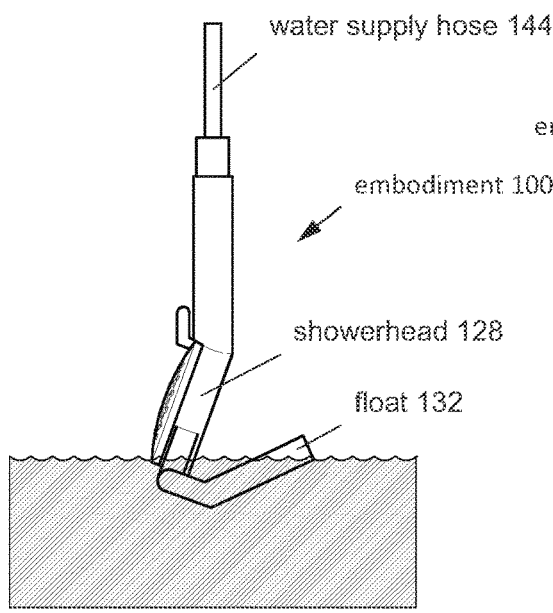
FIG. 10 is a profile of embodiment 100 when it has finished filling a bathtub.
Figure 11:
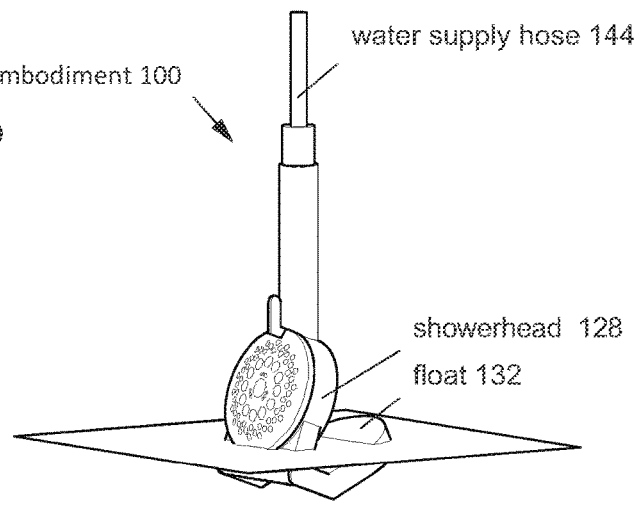
FIG. 11 is a perspective of embodiment 100 when it has finished filling a bathtub.

Beyond performing the functions of a conventional showerhead, embodiment 100 has the ability to fill a bath to a predetermined level. As shown best in FIGS. 4, 5, 6, 7, 8, 9, 10, and 11, to do this requires inverting showerhead 128 and dangling it from its water supply hose 144 at a predetermined height representative of the desired bath fill level. Simultaneous with this, float 132 is allowed to drop to its open position (FIGS. 7, 8, and 9) where it allows outflow of water through reservoir exit orifices 138. As the water fills in tub 108 (transition from FIGS. 8 and 9 to FIGS. 10 and 11), float 132 moves from its open position (FIGS. 8 and 9), up to a position high enough where it terminates the flow of water out of reservoir exit orifices 138 (FIGS. 10 and 11).

The user controls the height of showerhead 128 by pushing in and securing water supply hose 144 through snap-in clamp 146 at a showerhead 128 height representative of the desired bath fill level.

Clips 148 may be snapped in precise locations on water supply hose 144 to help remember previous desired bath fill levels (FIGS. 4, 5 and 6 especially). Such a snap fit might also be beneficial in mechanically securing supply hose 144 in position.

Clips 148 may be made with different colors or textures or markings or visual appearances to make it easy to go back to a specific previous desired bath levels.

FIGS. 1, 2 and 3 show embodiment 100 being used as a conventional showerhead with control lever 149 directing shower spray 150 to a plurality of spray modes, such as heavy rain, light rain, mist, etc.

FIGS. 4, 5, 6, 7, 8, 9, 10, and 11 demonstrate how embodiment 100 may be used to precisely fill a bath to a desired level by inverting and hanging showerhead 128 from water supply hose 144 into tub 102 at a specific height, and filling the bath using water passing through showerhead 128 which is controlled by the disposition of float 132 and the consequent disposition of cylindrical rotary valve 134. The height of water in tub 112 eventually raises float 132 to a position where water is shut off from passing through reservoir exit orifices 138 and into tub 112. And this occurring at the desired bath fill level.

FIGS. 12, 13, and 14 give details of a construction of embodiment 100.

Reservoir 136 is fixedly covered on its forward face by generally flat bulkhead 152 which includes bulkhead exit orifice 154. Bulkhead exit orifice 154 aligns with openings 158 (not shown) on the rear, generally flat, surface of shower face 156, each opening 158 being connected to specific shower face exit orifices 160 disposed on the forward side of shower face 156.

Generally flat bulkhead 152 may have multiple replaceable variants, each at least with a different size bulkhead exit orifice 154. Restricting the size of bulkhead exit orifice 154 on some of these variants, may provide a mandatory water restriction device, which does not restrict the flow of water filling the tub.

Figure 26:
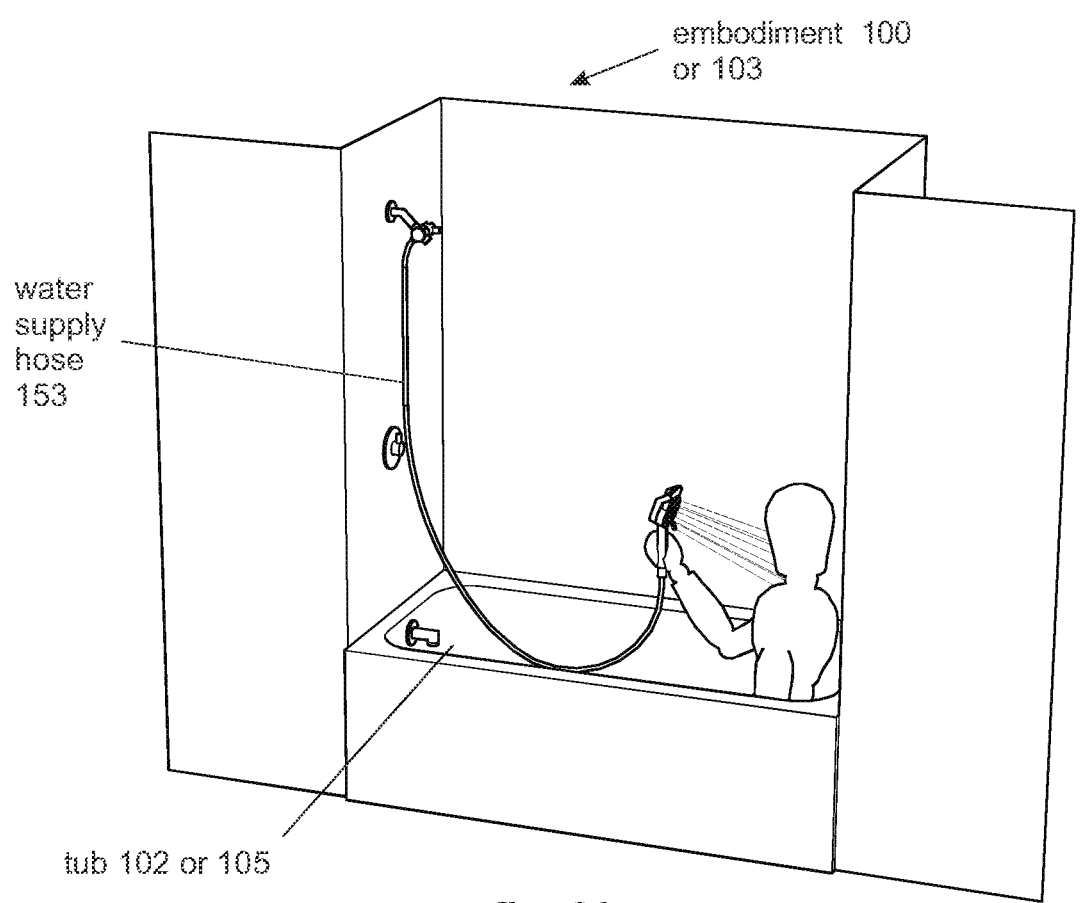
FIG. 26 is a perspective of either embodiment 100 or embodiment 103, or other embodiments herein, when it is used as a hand held shower during bathtub bathing.

Water supply hose 144, as shown in FIG. 26, is long enough to reach all parts of the body of a user sitting in tub 102 or 105.

Similar to some currently marketed showerheads, using control lever 149 to rotate shower face 156 relative to reservoir 136, causes bulkhead exit orifice 154 to align with specific openings 158 (not shown) on the rear of shower face 156 with the consequence of passing water through particular shower face exit orifices 160, with the result of changing shower spray 150 to various modes of dispersal (as a non-limiting and non-exhaustive example, to hard rain, soft rain, mist, etc.).

Also similar to some currently marketed showerheads, one or more water powered rotary members (not shown) inside of shower face 156 may further alter shower spray 150 to disperse intermittently, or rotationally, or with other regular or irregular varied qualities.

Embodiment 103, FIGS. 15 Through 26:

Referring to FIGS. 15 through 25, embodiment 103 is similar in many respects to embodiment 100, except it replaces float 132 and cylindrical rotary valve 134 with fixed integral float 148 and spring loaded and lockable lever valve 146.

In use, embodiment 103 shares many similarities with embodiment 100.

Showerhead 150 is inverted (FIGS. 18, 19, 22, and 25) and suspended at an adjustable predetermined height by water supply hose 153 being pressed into snap-in clamp 157, which is disposed at one end of lever 155 (FIGS. 20, 21, 23, and 24 in particular).

A counterbalance spring (not shown) inside of spring-loaded and lockable lever valve 146 is adjusted to exert lift on supply hose 153 equal to most of the weight of water filled showerhead 150 and the portions of water filled supply hose 153 between snap-in clamp 157 and showerhead 150.

Rotating lock knob 159 results in lever 155 either being locked or not locked in its open, water pass-through position, as shown in FIGS. 18, 19, 20, and 21. When locked in this position, embodiment 103 may be used as a conventional showerhead.

When rotating lock knob 159 is rotated to its not locked position, and showerhead 150 is suspended from snap-in clamp 157 by water supply hose 153, and before bathtub 105 is filled; the weight of showerhead 150 and the water-filled water supply hose 153 between snap-in clamp 157 and showerhead 150, is sufficient to hold lever 155 in its down, water allowed to flow through and out of showerhead exit holes 161, condition (FIGS. 18, 20, 21 and 22).

As tub 105 fills with water supplied through showerhead exit holes 161, the buoyancy of fixed integral float 148 floating in the deepening water of tub 105, reduces downward forces on snap-in clamp 157 enough that preset counterbalance spring forces on lever 155 are sufficient to lift lever 155 to a point where spring-loaded and lockable lever valve 146 shuts off water flowing out of showerhead exit holes 161, as shown in FIGS. 19, 23, 24, and 25.

This occurs at the preset bath fill level established when water supply hose 153 was first pushed into snap-in clamp 157.

Embodiment 106, FIGS. 27 Through 32:

Referring to FIGS. 27 through 32, embodiment 106 is similar to embodiment 103, except by determining rising water levels in tub 105 using the buoyancy of showerhead 150 dangling off of snap in clamp 157 from water supply hose 153 to monitor water depth; embodiment 106 uses float 162, suspended at one end of line 174 which is engaged by adjustable pass through 164, which is disposed at one end of lever 166. Lever 166 is engaged on its other end to rotating shaft 168 which activates lever valve 170.

In its down position (FIGS. 27, 29, and 30), lever 166, in combination with spring-loaded lever valve 170, allows water to pass through to showerhead 172.

In its up position (FIGS. 28, 31, and 32), lever 166, in combination with spring-loaded lever valve 170, shuts off water going to showerhead 172.

Spring-loaded lever valve 170 uses spring tension to predispose lever valve 170 to its up, water off, position, and to counterbalance the weight of showerhead 172 and water within it (FIGS. 28, 31, and 32).

Showerhead 172 is adjustable, using lever 176, to various spray modes (as non-limiting and non-exhaustive examples, heavy rain, light rain, mist, etc.), including a mode where all water flowing through showerhead 172 is shut off, and including a mode where central tub filling orifice 178 is open to water flowing into showerhead 172 (FIGS. 27, 29, and 30).

In use, a user adjusts line 174 so that float 162 is at a desired bath fill height, and then the user turns on water to the shower. Because spring-loaded lever valve 170 is in its down position, held down by the non-buoyant weight of float 162, water flows through to showerhead 172, which in turn projects water stream 180 out of tub filling orifice 178, and into tub 108, thus putting water into tub 108 (FIGS. 27, 29, and 30).

Water flows into tub 108 until it is deep enough to buoy float 162, which causes, under spring tension, lever 186 to move to its up, water off, position (FIGS. 28, 31, and 32). This occurs when water in tub 108 is at the desired fill level.

To use embodiment 106 as a conventional shower, a user simply opens bathtub drain 182, and sets lever 166 on showerhead 172 to the desired shower spray mode. Because bathtub drain 182 is open, water drains out of tub 108 before there is enough in tub 108 to float 162 to a level where it will turn off spring-loaded lever valve 170. If desired, a user may raise float 162 so that it is more out of the way.

Embodiment 110, FIGS. 33 Through 35:

Embodiment 110 is similar to embodiment 106, except, instead of using float 162 hanging on line 174 to activate or not activate spring-loaded lever valve 170, embodiment 110 uses electronic sensor 184 to activate control valve 186, which allows or prevents water from flowing into showerhead 188.

Electronic sensor 184 includes detecting unit 190 to measure water levels within tub 112. Detecting unit 190 may employ sonar, radar, optical, or other suitable means to measure water levels within tub 112.

A user sets the desired bath fill level by turning knob 192. This setting includes the ability to set control valve 186 to a continuously on position, so that showerhead 188 may be used as a conventional, wall-mounted shower.

Adjustment lever 194 on showerhead 188 allows showerhead 188 to be adjusted to various shower modes (as non-limiting and non-exhaustive examples; heavy rain, light rain, mist, etc.), as well as to be adjusted to a mode which shuts off all water flowing through showerhead 188, as well as to be adjusted to a mode where water stream 196 projects out of tub filling orifice 198 during the process of filling tub 112.

This arrangement allows tub filling orifice 198 to receive unrestricted amounts of water.

Alternatively, during the process of filling tub 112, normal shower outlet exit orifices 197 may be used to supply water to fill tub 112.

In use, a user sets the desired fill level by turning knob 192, and then turns on the shower. Water flows out of tub filling orifice 198, or out of normal shower outlet exit orifices 197, until detecting unit 190 senses the bath fill level that was set by turning knob 192, has been reached. At that time, electronic sensor 184 shuts off water going through control valve 186 and into tub 112, and the desired bath fill level has been achieved.

Figure 36:
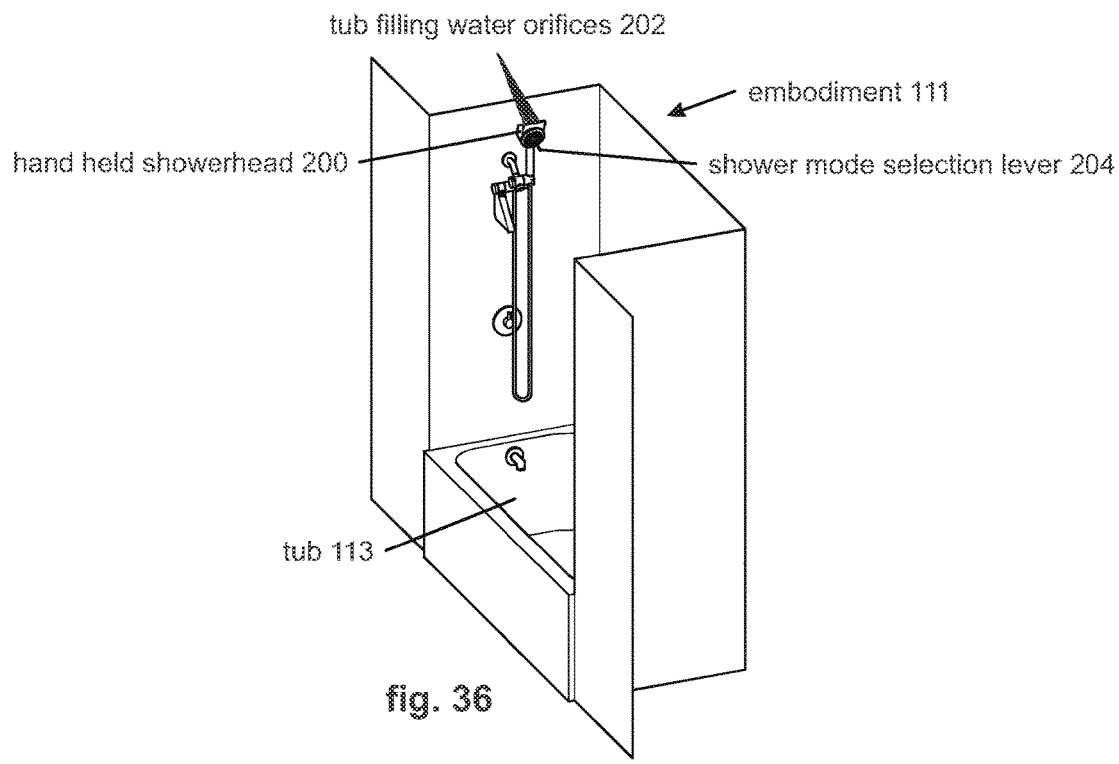
FIG. 36 is a perspective of embodiment 111, before filling tub 112.
Figure 37:
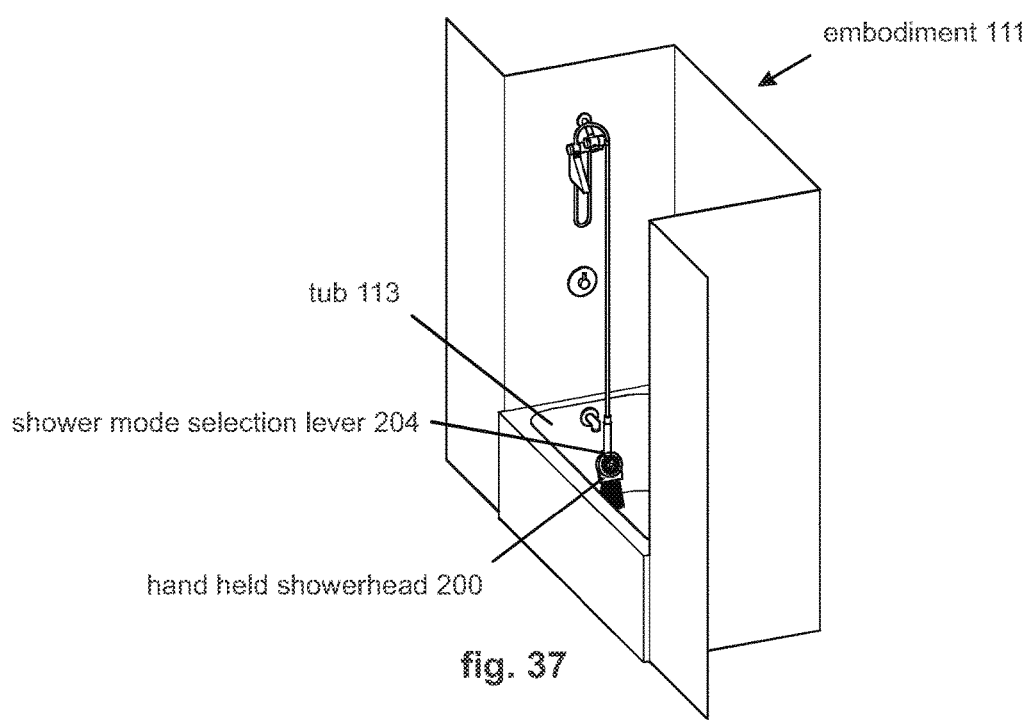
FIG. 37 is a perspective of embodiment 111, while filling tub 112.

Embodiment 111, FIGS. 36 and 37:

Referring to FIGS. 36 and 37, embodiment 111 is similar to embodiment 110 except instead of filling tub 112 with water exiting through tub filling orifice 198, or normal shower outlet exit orifices 197; embodiment 111 uses water flowing out of hand held showerhead 200 which is dangled into tub 113, to fill tub 113 (FIG. 37).

This may make water transfer into tub 113 more thermally efficient (i.e. less heat lost by water passing through air), as well as reduce undesirable splashing during filling tub 113. Tub filling water orifices 202 (FIG. 36) on the top of showerhead 200 may be opened using shower mode selection lever 204, and used during the filling of tub 113. Using orifices 202 during the filling of tub 113 while showerhead 200 is dangled into tub 113, as shown in FIG. 37, may help to further reduce undesirable splashing during bath filling.

Embodiment 114, FIGS. 38 Through 41:

FIGS. 38 through 41 show embodiment 114. Embodiment 114 includes showerhead 206 and oral hygiene unit 208, both of which are connected to standard shower arm 210 through diverter adapter 212.

Oral hygiene unit 208 is similar to WATERPICK brand teeth and gum cleaning units. More specifically, oral hygiene unit 208 takes water coming from standard shower arm 210 and, through diverter adapter 212, exits the water through extended outlet nozzle 214.

Turning diverter control knob 216 controls whether diverter adapter 212 channels water to showerhead 206, or to oral hygiene unit 208, or to both.

Pushing button 218 in 220 activates the flow of water through extended outlet nozzle 214. Releasing button 218 cuts the flow of water through extended outlet nozzle 214.

In use, a user turns diverter control knob 216 to a position where water flows to oral hygiene unit 208. The user then turns on the shower and inserts extended outlet nozzle 214 into their mouth, and then presses button 218 in 220, and then directs extended outlet nozzle 214 such that its squirts water to clean oral features.

Embodiments 116 and 118, FIGS. 42 Through 61:

FIGS. 42 through 61 show embodiments 116 and 118. Embodiment 118 is essentially a shower caddy which shares components with embodiment 116.

More specifically, embodiments 116 and 118 may share at least the following components:

removable wall mounts 222
mounting tube 224
shelves 226, and
storage mount for showerhead brushes 228

Figure 42:
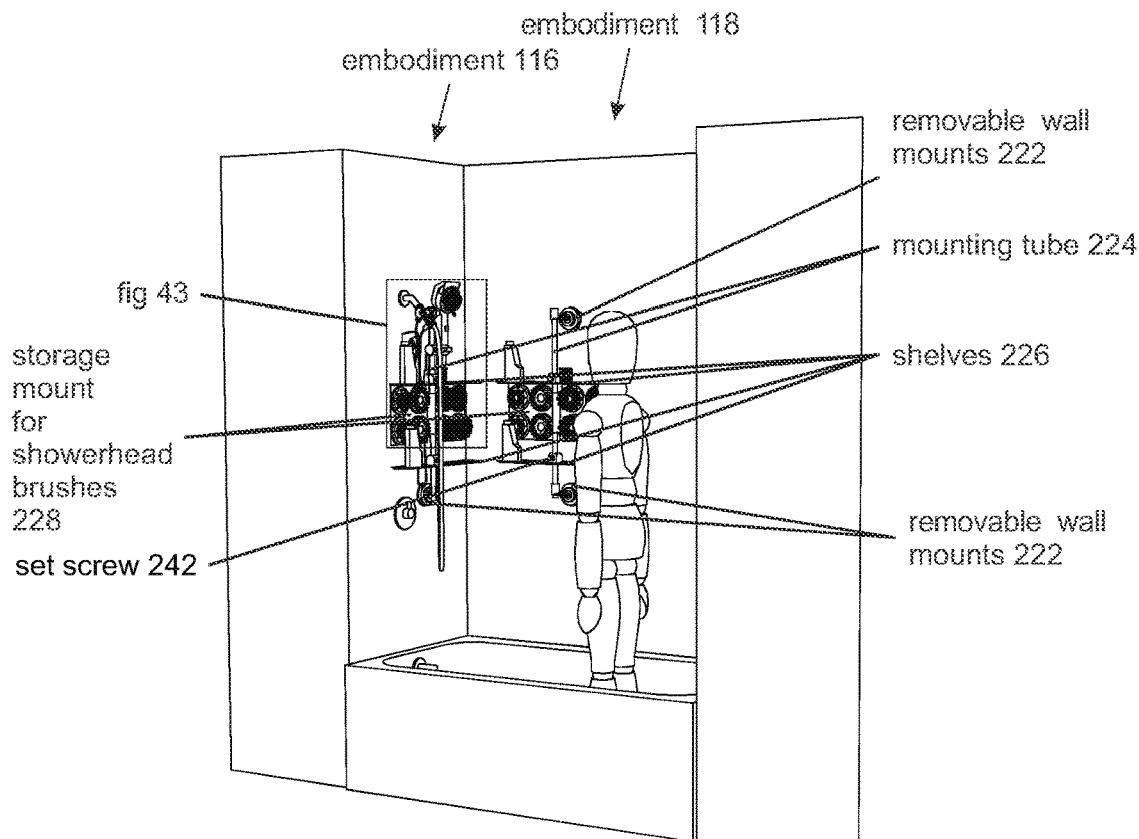
FIG. 42 is a perspective of embodiments 116 and 118.
Figure 43:
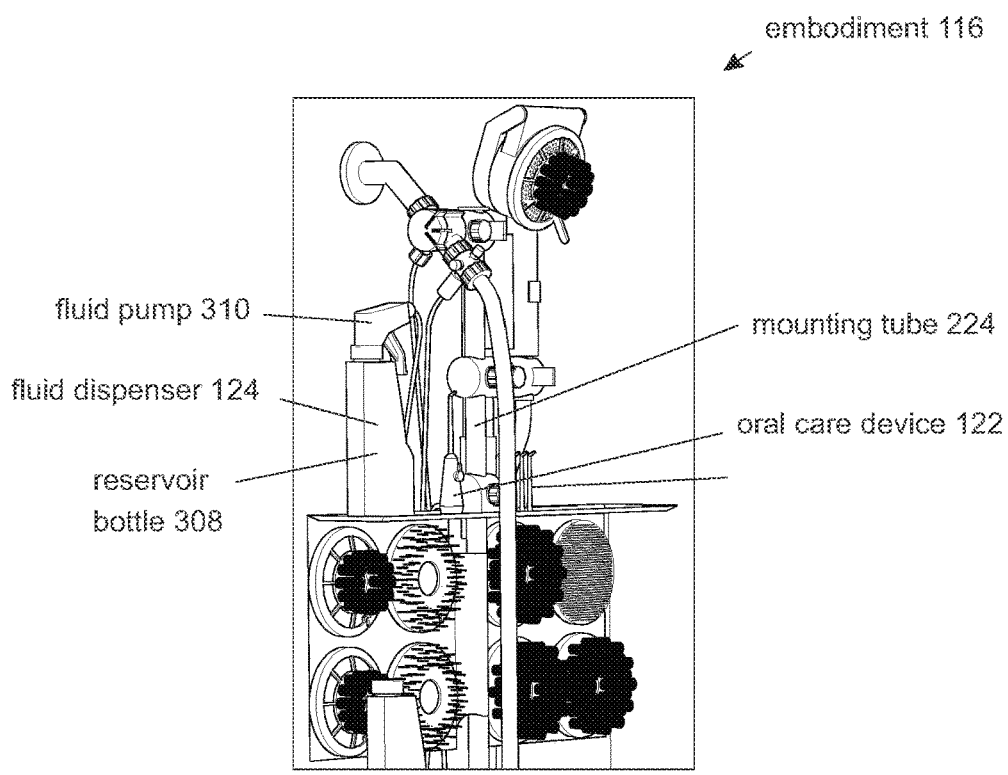
FIG. 43 is a detail of FIG. 42, as indicated in FIG. 42.

As Shown best in FIG. 42, embodiment 118 is secured to a vertical surface by removable wall mounts 222. As shown best in FIGS. 58 and 59, removable wall mount 222 includes on its rear portion, suction cup 230, which is secured and unsecured to smooth surfaces by turning knob 232, and possibly additionally, by lifting tab 234, which is disposed on the periphery of a rear directed face of suction cup 230. Lifting tab 234 (FIGS. 58 and 59) may help to break suction behind suction cup 230, at least when detaching suction cup 230 from a smooth surface.

Removable wall mount 222 can be secured directly to a smooth surface using suction power alone, or by using two-faced tape, or glue, or screws, or by other suitable means.

Removable wall mount 222 can also be secured to a surface by first securing a smooth sheet, such as, by way of a non-limiting and non-exhaustive example, a smooth sheet of plastic or metal to the surface, using two-faced tape, glue, screws, or other suitable means; and then securing removable wall mount 222 to the smooth sheet using suction cup 230, or other suitable means.

Further, removable wall mount 222 can be secured to a surface by first mounting a holster to the surface, the holster being configured to position and hold removable wall mount 222 within it. Securing the holster to the surface can also be done using two-faced tape, glue, screws, or other suitable means.

Figure 58:
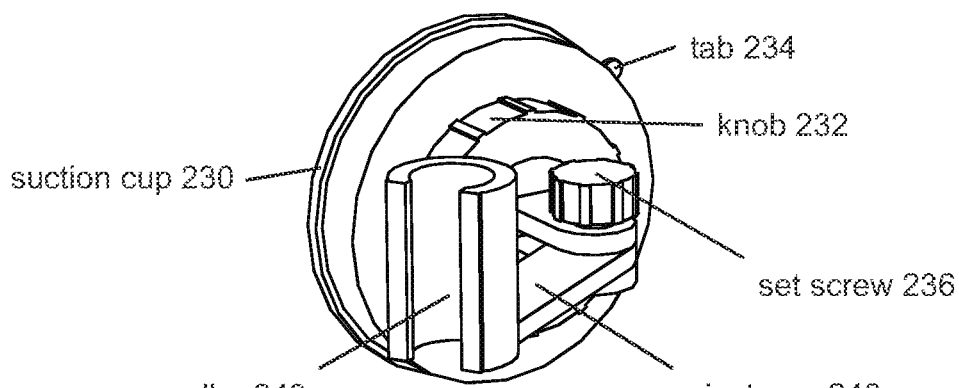
FIG. 58 is a detail of your 56, as indicated in FIG. 56.
Figure 59:
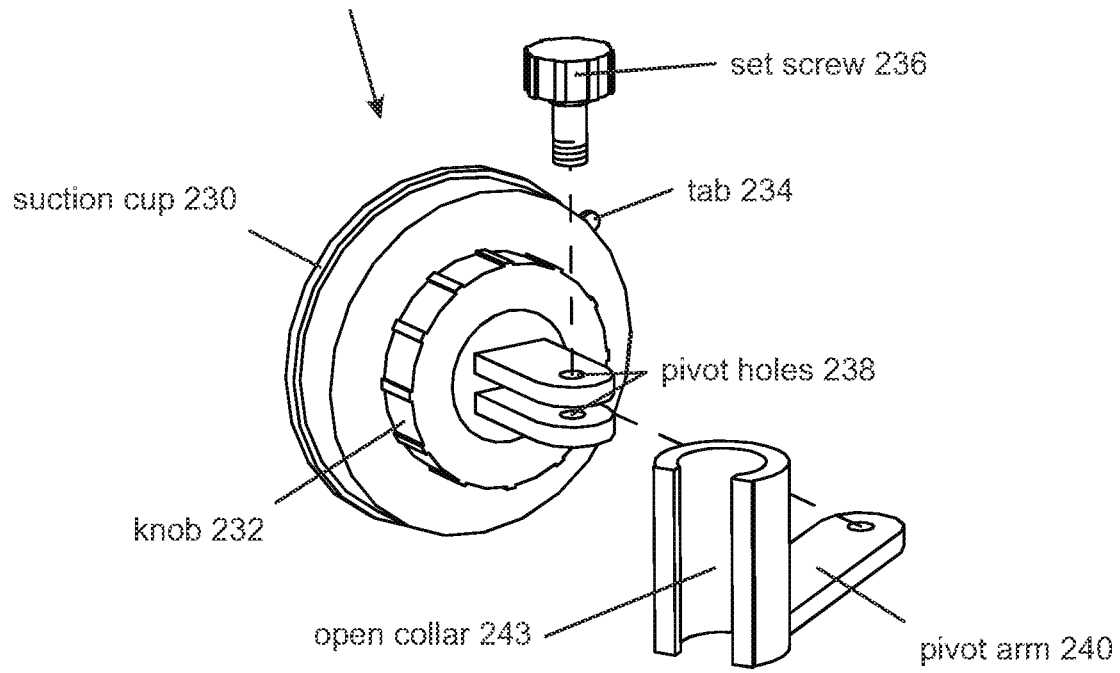
FIG. 59 is an exploded perspective of FIG. 58.

Referring to the details of removable wall mount 222 shown in FIGS. 58 and 59, set screw 236 passes through pivot holes 238 to tighten pivot arm 240 at various radial dispositions. Open collar 243 secures to the top or any portion along mounting tube 224. Pivot arm 240 allows for positioning mounting tube 224 at various distances from the surface to which removable wall mount 222 is secured to.

Referring to FIGS. 42 and 46, in embodiments 118 or 116, the upper end of mounting tube 224 may be held in removable wall mount 222 or within mount 254, with the aid of flange 244, which is disposed at the upper end of mounting tube 224 (FIG. 46).

Referring to FIG. 44, set screw 242 positions and secures shelves 226 along mounting tube 224.

FIGS. 45 through 47 and FIGS. 54 through 60 isolate portions of embodiment 116 pertaining to showering.

More specifically, like all embodiments herein, embodiment 116 is configured to at least attach to a standard shower arm 246.

Figure 60:
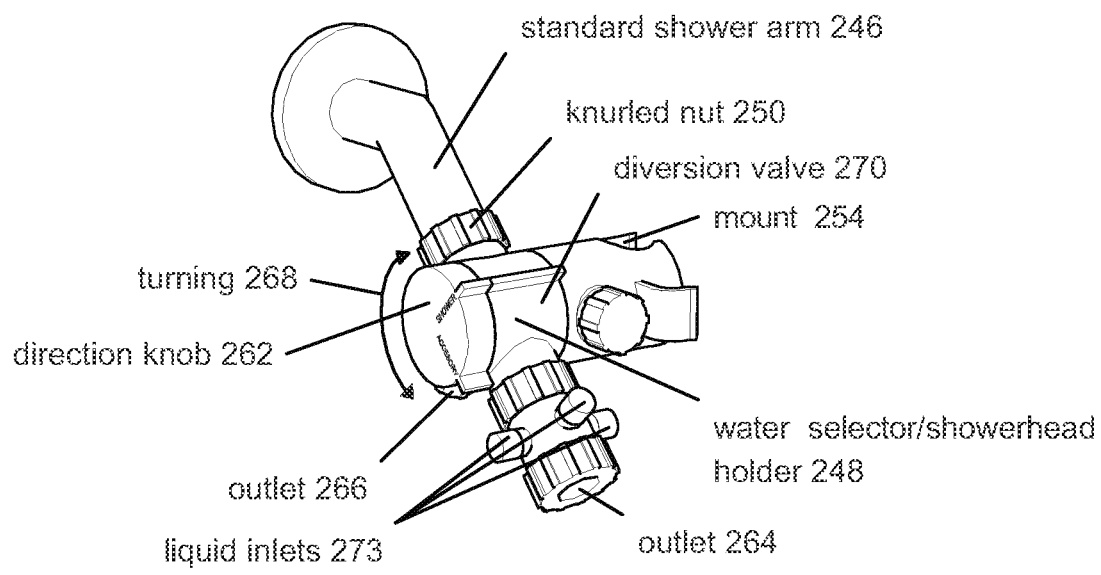
FIG. 60 is a perspective of diversion valve 270.

Water selector/showerhead holder 248 screws onto standard shower arm 246 using knurled nut 250 (FIG. 60). In mount 254, water selector/showerhead holder 248 is configured to hold both showerhead 252 (similar to FIG. 3), and mounting tube 224 (FIGS. 44, 45 and 46).

Showerhead 252 may also be handheld (similar to FIG. 26), and is configured to fit into showerhead holder 256, which in turn is configured to traverse up and down on mounting tube 224, and to be set in radial position by set screw 258, and traverse position by set screw 260 (FIG. 46).

Turning 268 direction knob 262 (FIG. 60) activates diversion valve 270 and determines whether water flowing in through shower arm 246 flows out of outlet 264 or out of outlet 266 (FIGS. 49 and 60—similar in construction to FIG. 61).

Diversion valve 270 may be of the valve type which breaks the flow of water going out of both outlet 266 and outlet 264 during the transition between allowing water to flow out of outlet 266 alone and allowing water to flow out of outlet 264 alone (FIG. 60).

Alternatively, diversion valve 270 could have three positions with no breaks between them: with position one, allowing water to flow out of outlet 264 alone; position two, extending between position one and position three and variably allowing water to flow out of both outlet 264 and 266 in various proportions; and position three, allowing water to flow out of outlet 266 alone (FIG. 52). If this construction is chosen, it may be advantageous to place a one way valve (a backflow preventer) between liquid inlets 273 and diversion valve 270 to prevent liquid entering through liquid inlets 273 from co-mingling with water exiting out of outlet 266.

FIGS. 45 and 46, Detachable Showerhead Extension Handle 272:

FIGS. 45 and 46 show detachable showerhead extension handle 272 which can couple and uncouple to showerhead 252 to extend the reach of showerhead 252 for easier and more complete full-body bathing.

Alternatively, handle 272 may be of other design. As non-limiting and non-exhaustive examples, it may be a telescoping handle fixedly attached to showerhead 252, such as used on foldable umbrellas or on wheeled luggage carriers; it may be like a mop handle, which screws onto showerhead 252; or it may be of other useful design FIGS. 44 Through 47 and 54 Through 57, Replaceable Shower Faces 126:

FIGS. 44 through 47 and 54 through 57 show replaceable shower faces 126. Each of these faces 126 snap onto showerhead 252 (FIG. 47). As non-limiting and non-exhaustive examples (FIGS. 54 and 55), there may be dedicated faces with moderate to stiff bristles 274, used for scrubbing dirty hands and feet, and/or for cleaning tubs and/or shower enclosures, and/or for other cleaning tasks, and/or for other reasons. All while conveniently flushing the removed dirt and debris down the drain.

And/or there may be faces 126 with wire-like soft plastic bristles 276, similar to styling brushes (FIG. 63), for deep massaging and cleaning the scalp while shampooing.

And/or, there may be faces 126 with soft bristles 280, for cleansing the face and other delicate body areas, while conveniently removing cleansed dirt and oil immediately down the drain, and while softening the skin with warm or cold water, and desirably preparing the skin with warm or cold water for skin lotions and preparations, and/or for other purposes.

And/or, there may be faces 126 with a cheese grater like abrasive surface 278 similar to many currently available non-shower callous removers (FIG. 64), for removing calluses in the shower where dead skin can be conveniently just wash down the drain automatically along with shower water, and where warm water can simultaneously help soften and remove the calluses. Disposing of dead skin after callous removal has long been a well-recognized and disgusting problem.

And any of the aforementioned replaceable shower faces 126, as well as other designs, might be differently colored or otherwise graphically and/or form identified, to make quick user selection, as a non-limiting and non-exhaustive example, among family members, easier.

And any of the aforementioned replaceable shower faces 126 might be either disposable and/or rechargeable battery-powered, to spin portions of their faces and make their shower operation quicker and easier. This, as a non-limiting and non-exhaustive example, might be similar to currently available handheld waterproof battery-powered massagers (FIG. 65), and shavers.

Storage mount for showerhead brushes 228 (FIGS. 55 and 56) may make it easier to access a wide variety and number of replaceable shower faces 126, giving versatility to each user, and allowing for a plurality of users.

Vertically disposed storage mount 228 is space efficient, helping maximize the number of replaceable shower faces 128 which may be stored within confined bathing environments.

One or more storage mount for showerhead brushes 228 may be optionally and removably mounted on embodiment 116 and/or on embodiment 118 (FIG. 42).

Shelves 226 are optional and vertically adjustable, and provide storage area, including for accessories mentioned herein.

Embodiments 116 and 118 may support zero or more shelves 226 (FIG. 42).

Oral Care Device 122, FIGS. 43, 44, 48, 49, and 50:

Oral care device 122 is shown in FIGS. 43, 44, 48, 49, and 50.

As shown best in FIG. 49, oral care device 122 receives water through outlet 266 in diversion valve 270. Direction knob 262 controls whether water emanating from standard shower arm 246 is directed to outlet 264 which can attach hose 265 which leads to showerhead 252, or whether water emanating from standard shower arm 246 is directed to outlet 266 which can attach oral care device 122 as shown in FIGS. 48 and 49, or whether water can flow to both outlets, in varying degrees.

Oral care device 122 has base 123 which comprises oral care device on off switch 125, which allows user control conveniently at base 123 of whether oral care device 122 is turned on or off.

Base 123 removably attaches several interchangeable heads 127 which squirt water directed through base 123 onto various locations, generally within the mouth, so that such locations may be cleaned, and/or for other purposes.

Optionally, a rotating impeller within base 123 may interrupt and pulse the flow of water passing to interchangeable heads 127. This is similar to the way massaging shower heads currently work. Such pulsing may help cleansing and promote gum health.

Interchangeable heads 127 may be of many configurations. As non-limiting and non-exhaustive examples, they may be of any of the many currently used heads on the WaterPik® water flossing product currently on the market. They may contain brush bristles and/or elastomeric tips to help in cleaning oral surfaces mechanically. They may contain abrasive surfaces. They may also have separate secondary feeds to introduce liquids, such as mouthwash or fluoride or medications, during the water squirting process.

Interchangeable heads 127 may be simple tapering tubes which exit a squirt gun like stream, or they may be toothbrush-like with water streaming around and/or through the bristles to clean and clear debris. Or they may be of other useful configurations.

In use the user would attach oral care device 122 to outlet 266, and attach the appropriate interchangeable head 127 to base 123. The user would then turn direction knob 262 so that it directs water to outlet 266, and turn on the flow of water to standard shower arm 246. The user would then use oral care device 122 to clean appropriate surfaces.

For user convenience, at any time while using oral care device 122, the user may turn off or on device 122 using on off switch 125.

FIGS. 51, 52, and 53, Lotion and Fluid Dispenser:

FIGS. 51 through 53 show lotion and fluid dispenser 124. Dispenser 124 is comprised of reservoir bottle 308, which supplies fluid to fluid pump 310, which in turn pumps the fluid through tube 312 and backflow check valve 314, into diversion valve 270, where it is integrated into water entering through standard shower arm 246, and delivers the integration where diversion valve 270 directs, including, but not necessarily limited to, outlet 264 which is configured to accept hose 265 which delivers the integration into showerhead 252, as well as through outlet 266 which delivers fluids to oral care device 122 (FIG. 49).

Various fluids may be integrated for delivery at least through showerhead 252 and//or through oral care device 122. As non-limiting and non-exhaustive examples: shampoos, hair conditioners, facial lotions, body lotions, body washes, soaps, detergents, antibacterial and antifungal fluids, hair bleaches and colorings, anti-itch medications, dandruff treatments, dry skin treatments, fingernail and toenail treatments, medications of various types for topical delivery, medications delivered for inter-dermal infusion, tanning lotions, body hair treatments, aromatherapy treatments, perfumes, mouth rinses and washes, as well as other useful fluids.

Reservoir bottle 308 may be of various configurations including, but not limited to, cylindrical, rectangular, irregular forms, etc.

Reservoir bottle 308 may be plural, with each containing its own discrete fluid, and/or with one or more containing reserve supplies of a single fluid. Reservoir bottles 308 containing different fluids may be of different forms, helping to differentiate them.

Where there are plural reserve bottles 308's, each may include one or more of: fluid pump 310, tube 312, and check valve 314.

Fluid pump 310 is shown as a hand operated fluid pump similar to that used on household products such as WINDEX brand cleaner or Formula 409 brand cleaner. Alternatively fluid pump 310 could be a bulb pump similar to that used on perfume bottles and home gasoline siphons, or it could be an electrically operated pump, such as a battery operated aquarium pump, or it could be a SUPER SOAKER brand pressurized squirt gun type pump, or it could be a flexible vein type pump such as common hand drill operated hose pumps, or could be of any other useful pump design.

Check valve 314 may be of any useful design, including, but not limited to: ball check valves, flapper check valves, read check valves, etc.

Check valve 314 may occur at any location from within reservoir bottle 308 to within diversion valve 270, or any point in between.

Alternatively, check valve 314 may be absent. As a non-limiting and non-exhaustive example fluid dispenser 124 may rely on fluid pump 310 to prevent water from shower arm 246, back flowing into reservoir bottle 308.

In use, as a non-limiting and non-exhaustive example, a user would connect tube 312 to diversion valve 270 by screwing it onto liquid inlets 273 (FIG. 60). If the user wanted to apply a body wash, they would fill reservoir bottle 308 with the body wash. At any time the user wanted to apply the body wash, they would simply pump fluid pump 310.

More than one fluid dispenser 124's may be attached to diversion valve 270 through liquid inlets 273 (FIG. 60). Under such circumstances, various discrete fluids could be used for each attached fluid dispenser 124. This would provide versatility. As a non-limiting and non-exhaustive example, a user might use one fluid dispenser 124 to apply shampoo, and a second fluid dispenser 124 to apply hair conditioner.

Extra, non-attached reservoir bottle 308's could be capped and kept proximate to the shower for convenient fluid replacement.

The outlet of tube 312 may be disposed and coupled anywhere between and including diversion valve 270, and the surface being sprayed by showerhead 252. As non-limiting and non-exhaustive examples, it might attached directly into diversion valve 270 as shown, or anywhere along the hose 265, or directly into showerhead 252, or coupled to showerhead 252 with the outlet of tube 312 dispensing directly onto the surface being sprayed by showerhead 252.

Alternatively, the outlet of tube 312 may be disposed anywhere between and including diversion valve 270, and interchangeable oral care device heads 127, and/or coupled to oral care device 122, and deposits fluids directly onto surfaces proximate to it.

Figure 66:
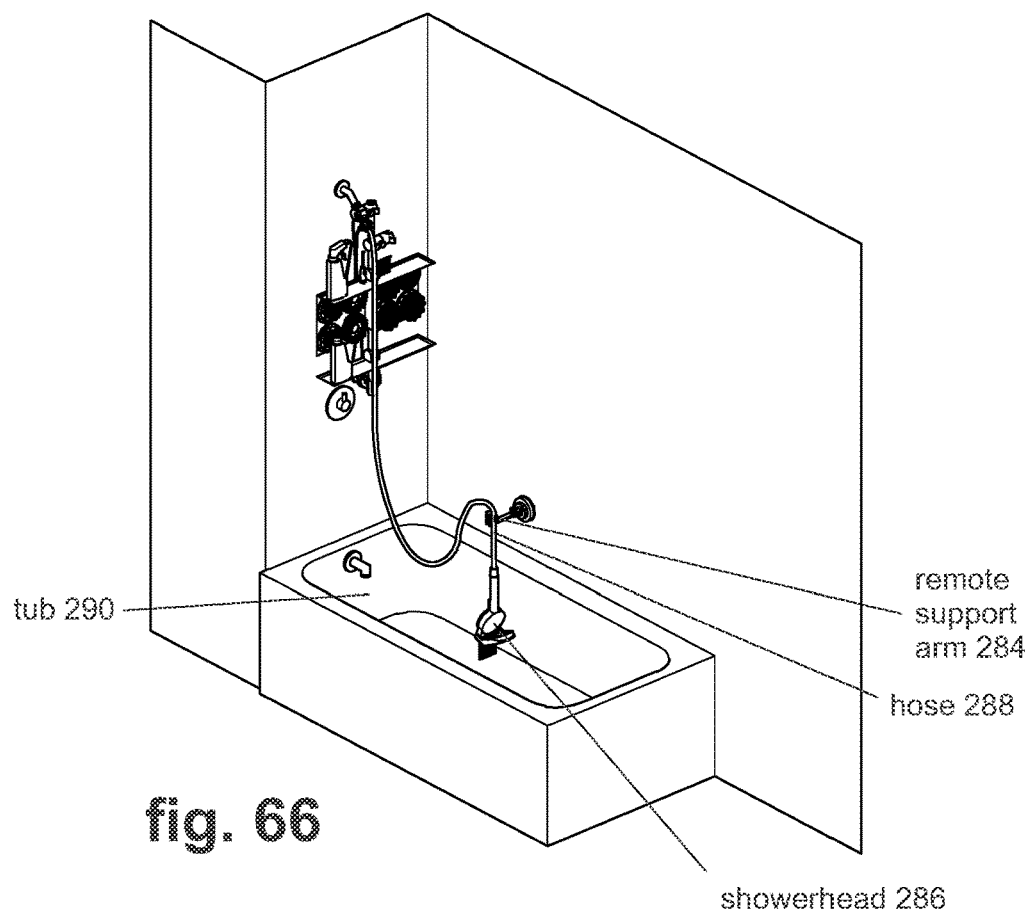
FIG. 66 is a perspective of remote support arm 284 in use while filling tub 290.
Figure 67:
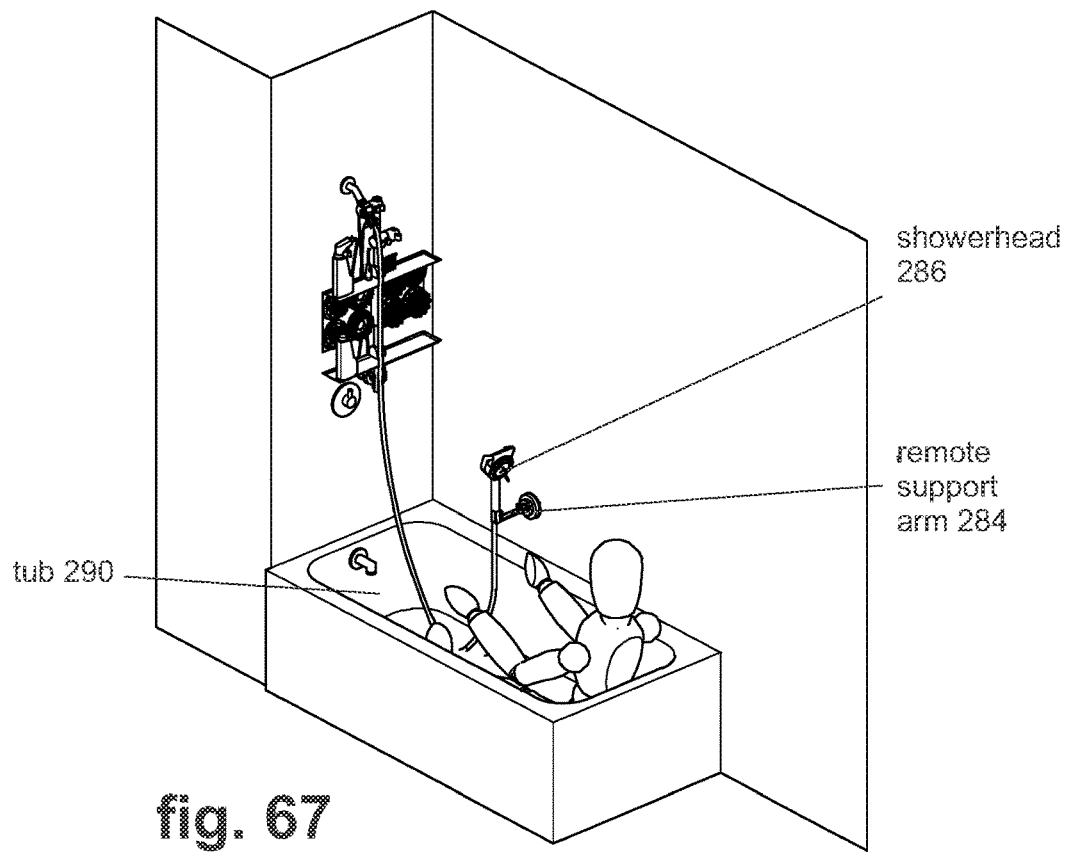
FIG. 67 is a perspective of remote support arm 284 in use during bathtub bathing.

FIGS. 66 Through 67 Remote Support Arm 284:

FIGS. 66 and 67 show remote support arm 284, which is constructed similarly to movable wall mount 222 (FIGS. 56, 58, 59), and allows showerhead 286 to be placed virtually anywhere within the bathing environment.

As non-limiting and non-exhaustive examples, FIG. 66 shows remote support arm 284 supporting showerhead 286 by its hose 288, with showerhead 286 in an inverted disposition while it is filling a bath into tub 290.

Using movable wall mount 222 as an analogy, open collar 243 frictionally engages hose 288 enough to both hold it in place when undisturbed, and allow it to be moved through collar 243 when pushed or pulled, thus allowing adjustment of the bath fill level.

Analogous open collar 243 is also configured to hold showerhead 286, as shown in FIGS. 67. This may be simply a convenient holder for showerhead 286, or it may be used as an adjustable showerhead locator, as a non-limiting and non-exhaustive example; like a low height or optional location shower.

Analogous suction cup 230 may be unfastened and fastened to facilitate aiming or other positioning of showerhead 286. Likewise, other articulation may be added, such as adding an adjustable elbow joint on pivot arm 240, to increase the versatility of mount 222.

Figure 68:
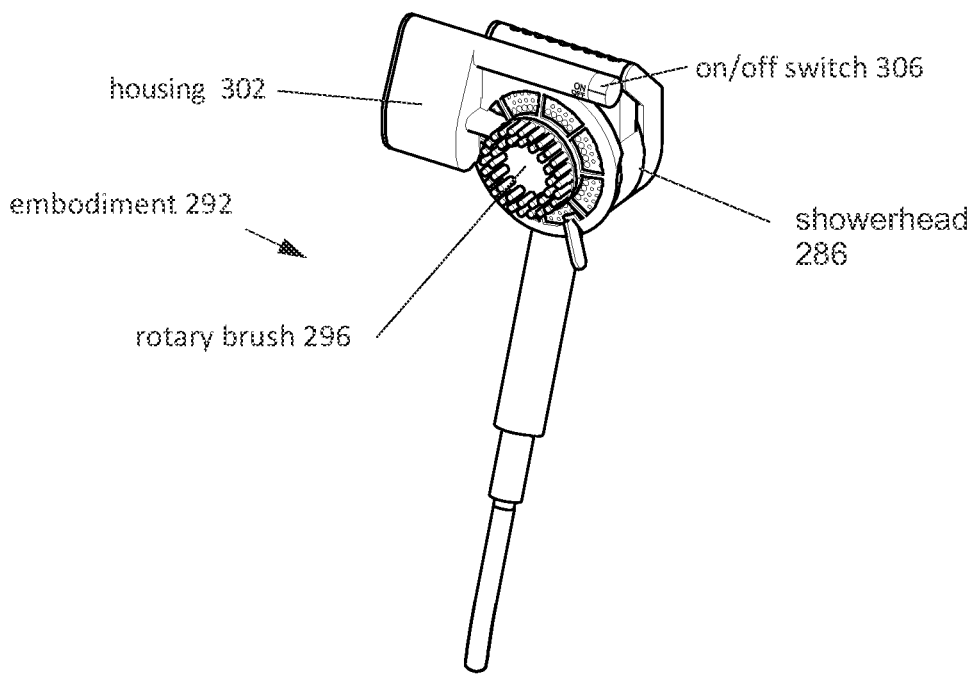
FIG. 68 is a perspective of embodiment 292.
Figure 69:
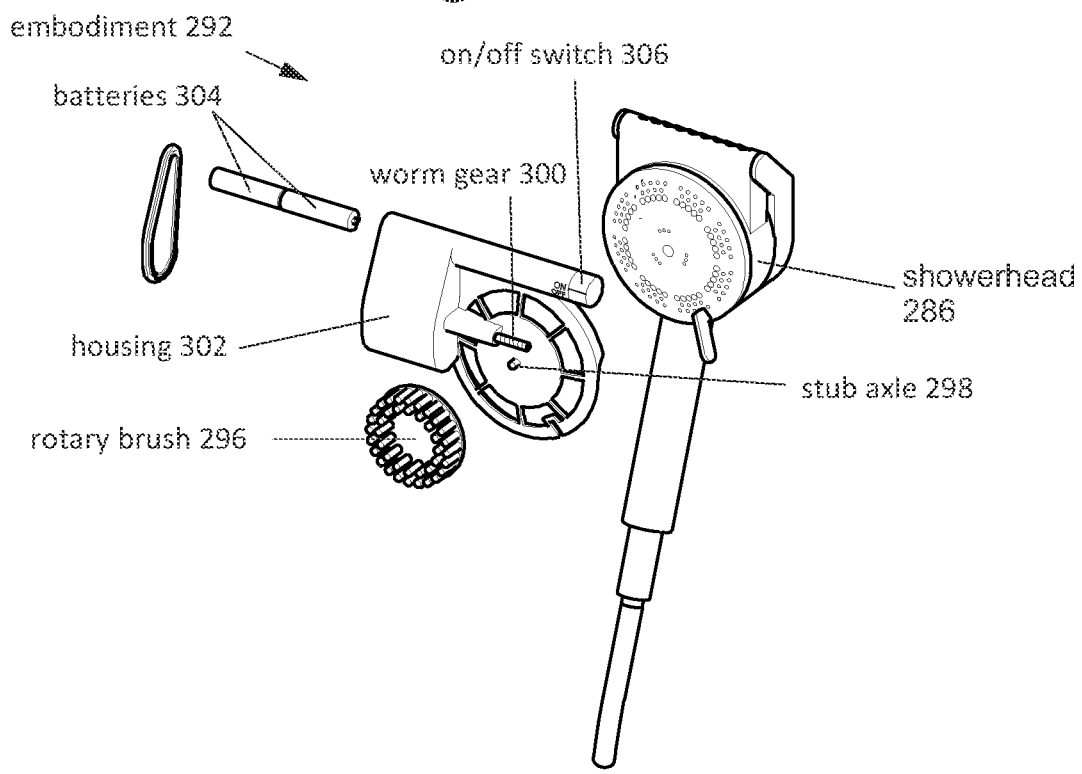
FIG. 69 is an exploded perspective of embodiment 292.

FIGS. 68 and 69, Embodiment 292:

FIGS. 68 and 69 show embodiment 292 which is a powered rotary brush head that snaps onto the face of showerhead 294.

Rotary brush 296 snaps on and snaps off of stub axle 298. Rotary brush 296 receives rotational power through a pinion gear centrally disposed on its backside engaging worm gear 300, which in turn is coupled at the end of the reduction gear train which extends from an electric motor located within housing 302.

Power for the electric motor comes from batteries 304, which are also located within housing 302.

On/off switch 306 allows user control of embodiment 292 operation.

Rotary brush 296 may be of many constructions. As non-limiting and non-exhaustive examples: it may be stiff to allow scrubbing off of heavy dirt, or cleaning the bathtub or shower enclosure, or heavy scrubbing on other objects, or for other reasons.

Alternatively it may be of medium or soft construction, for gentler cleansing or for applying lotions and oils, or for other reasons.

It may be of open foam or reticulated foam construction, or of naturally open cell materials, such as common sponges, loofah sponges, or of an abrasive nature, such as pumice or sandpaper, or emery cloth, or file surface, or cheese grater face.

Such constructions may be advantageous for various forms of cleaning, as well as for cosmetic exfoliation, callous removal, or for other applications.

FIG. 70 Through 73, Embodiment 316:

FIGS. 70 through 73 show embodiment 316 which is similar in many respects to embodiment 292, except instead of using a battery-powered electric motor to power rotary brush 296, as embodiment 292 did, embodiment 316 uses gear reduced rotary power derived from water driven impeller 318.

Figure 72:
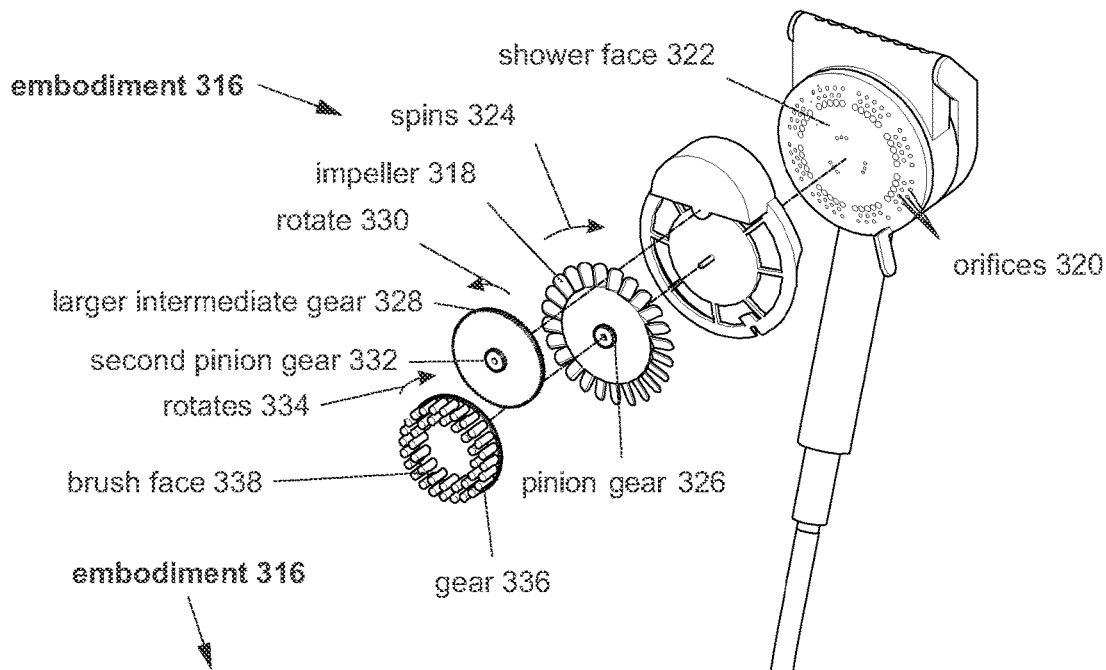
FIG. 72 is an exploded perspective of embodiment 316.
Figure 73:
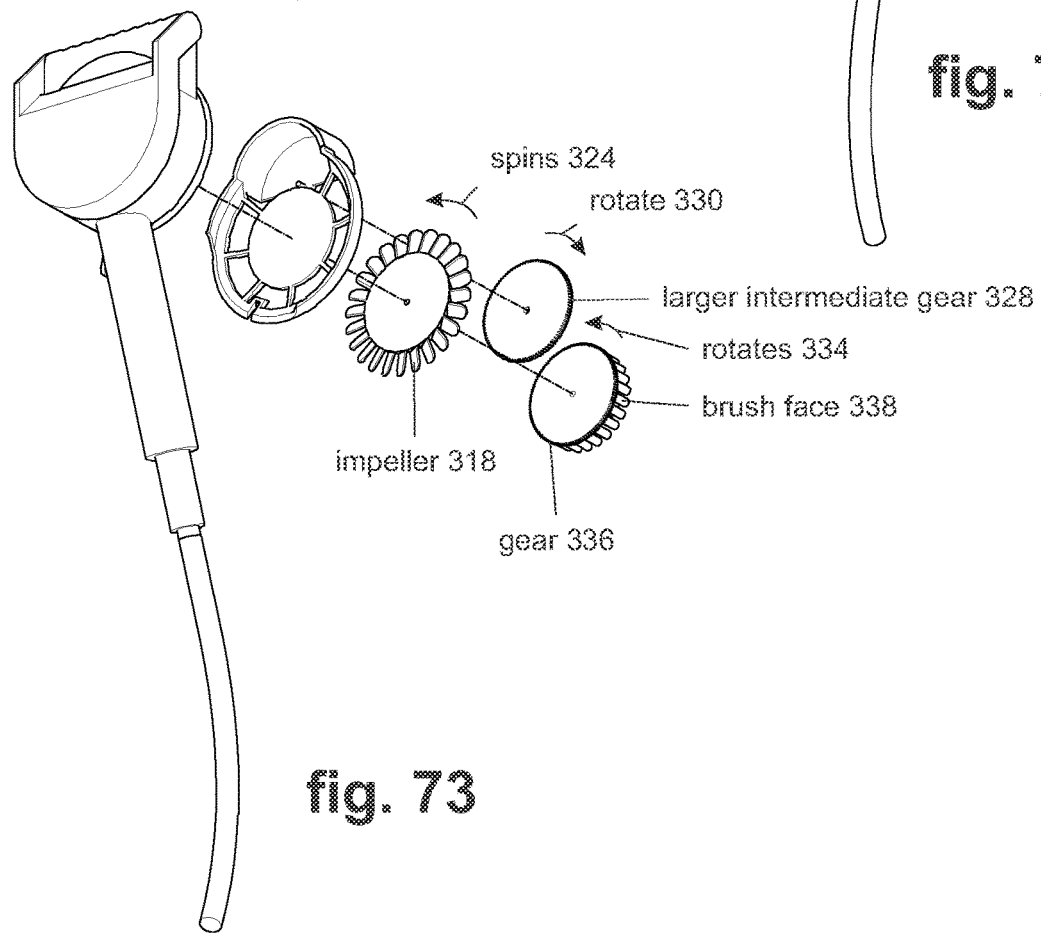
FIG. 73 is an exploded perspective embodiment 316 taken from behind and below the viewing plane.

More specifically, referring especially to FIGS. 72 and 73, water exiting orifices 320 in shower face 322, passes through and spins 324 impeller 318.

Integral with, and centrally disposed on the forward face of impeller 318, is pinion gear 326, which engages with larger intermediate gear 328, causing it to rotate 330.

Second pinion gear 332 is integral with, and centrally projects forward from the forward face of larger intermediate gear 328 (FIG. 72). Gear 332 engages with and rotates 334 brush peripheral gear 336 along with any brush face 338 it is integral with.

As illustrated in FIG. 71, components of embodiment 316 snap on to, and off of, showerhead 340.

Figure 74:
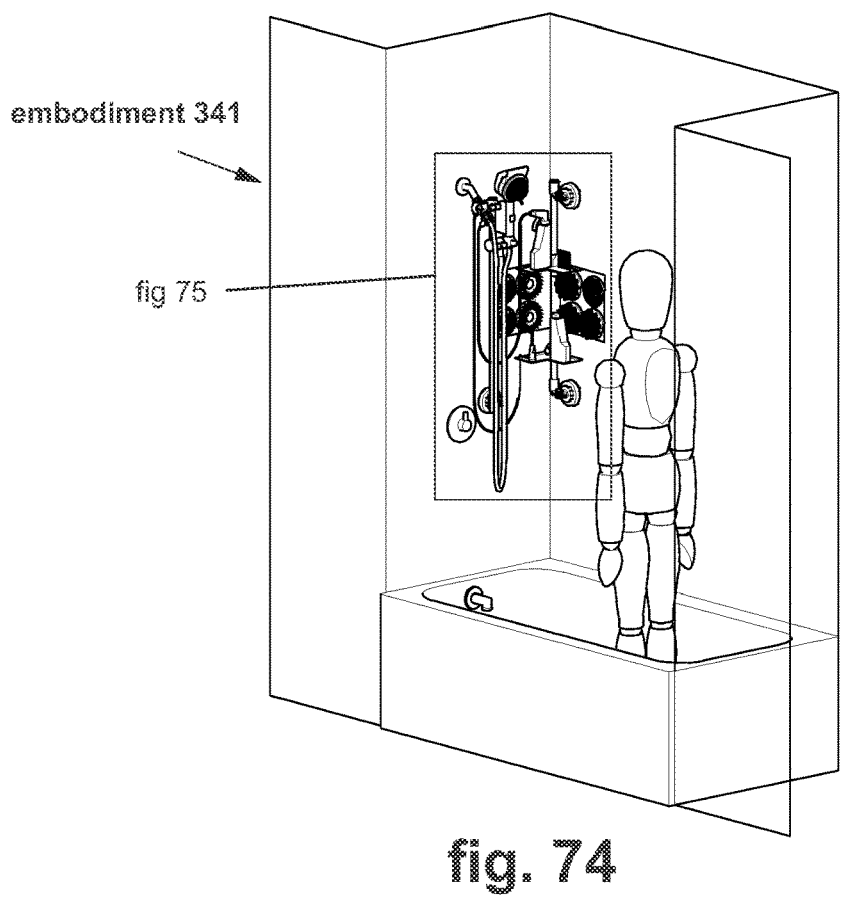
FIG. 74 is a perspective embodiment 341.
Figure 75:
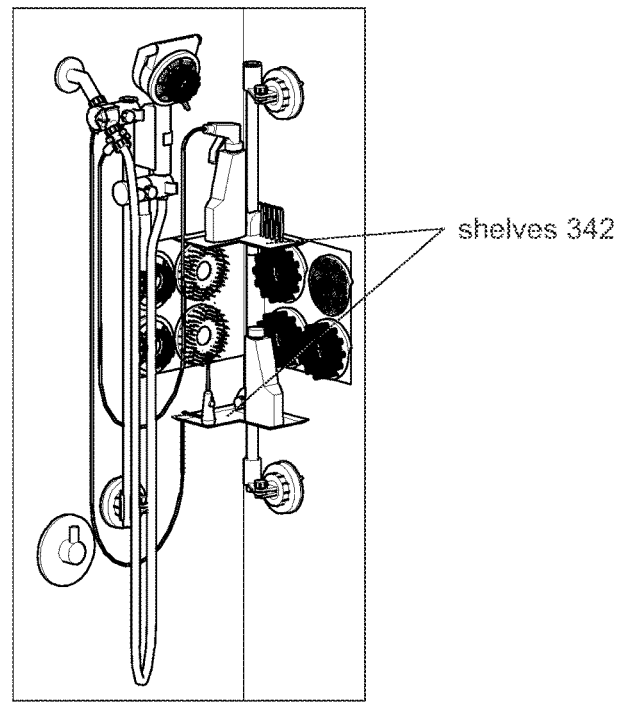
FIG. 75 is a detail of FIG. 74 as indicated in FIG. 74.
Figure 91:
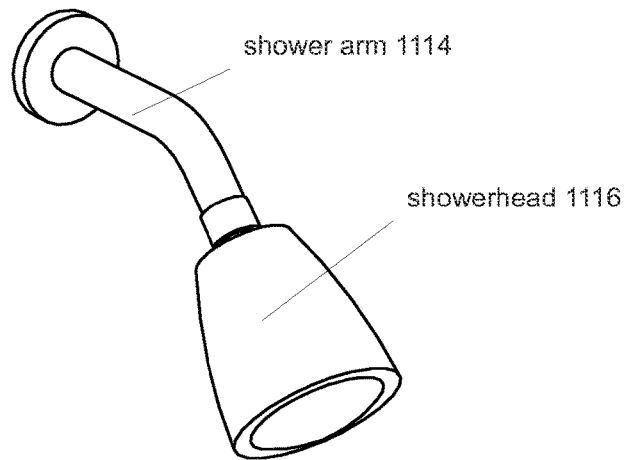
FIG. 91 is a perspective of a showerhead 1116 coupled to shower arm 1114, without embodiment 1110 installed.

FIGS. 74 and 75, Embodiment 341:

Embodiment 341 is essentially embodiment 118 (FIG. 42) but fitted into a corner. Components are as illustrated in FIGS. 42 through 60. Straight shelves 226 have been replaced by corner fitting shelves 342 (FIGS. 74 and 75).

FIGS. 76 and 77, Embodiment 344:

FIGS. 76 and 77 show embodiment 344, which is essentially the same as embodiment 106, (FIGS. 27 through 32), except valve 170 has been moved from being proximate to shower arm 165 in embodiment 106, to valve 346 being integral with bathtub spout 348 in embodiment 344 (FIGS. 76 and 77).

In use, the user adjust float 350 to the desired bath fill level, closes the drain, and turns on the water. Showerhead 352 is adjusted so no water can flow through it. When the desired bath fill level is achieved, the buoyancy of float 350 causes lever 354 to rotate upward which in turn causes valve 348 to shut off the water flowing through bathtub spout 342.

Depending on the configuration of the plumbing, opening the bathtub drain, and turning on showerhead 352 to the desire spray pattern, allows embodiment 344 to be used as conventional shower.

FIGS. 78 and 79, Embodiment 356:

FIGS. 78 and 79 show embodiment 356, which is essentially the same as embodiment 344 (FIGS. 76 and 77) except that it substitutes electronic sensor 356, which is similar to electronic sensor 184, in embodiment 110 (FIGS. 33 through 35), for valve 346 and float 350 in embodiment 344.

In use, the user sets the desired fill level using knob 358, closes the bathtub drain, and turns on the water at the desired bath temperature. The bath then fills until sensor 356 determines that the desired fill level has been reached, at which time sensor 356 shuts off water flowing through bathtub spout 360.

Embodiments of present inventions may fill a household bathtub to a user-specified depth, utilizing water emanating from an overhead bathroom shower arm.

Embodiments may be installed by detaching an existing showerhead from an associated existing shower arm, attaching the embodiment to the shower arm, and then attaching the showerhead to the embodiment.

Embodiments may control the bathwater depth by providing a user input indicating the user desired bathwater depth, then sensing the water depth as a bathtub is filling from water emanating from the associated overhead shower arm, and then shutting off the flow of water from the shower arm to the bathtub when the user inputted desired bathwater depth is achieved.

Embodiments teach various methods for user inputs of a desired bathwater depth, including both electronic controls, and mechanical inputs.

Embodiments teach various methods for sensing bathwater depth, including water buoyant floats, and electronic sensing such as radar and/or sonar.

Embodiments teach various methods for shutting off the flow of water emanating from a showerhead into an associated bathtub, including mechanically and electronically actuated valves.

Referring to FIGS. 80 through 92, embodiment 1110 is an embodiment of present inventions. It includes a diverter valve/manifold 1112, which has an input receptacle 1146 configured to couple to, and accept water from, an associated existing shower arm 1114.

Diverter valve/manifold 1112 includes a first output 1148 configured to mount and convey water to a showerhead which may have been formerly mounted to shower arm 1114.

Diverter valve/manifold 1112 includes a second output 1150 configured to convey water into associated bathtub 1101 disposed below shower arm 1114.

Upper fill pipe 1118 couples to, and accepts water from, second output 1150. Lower fill pipe 1128 slidably telescopes over the outer perimeter of the lower end of upper fill pipe 1118, and allows lower fill pipe 1128 to laterally traverse along upper fill pipe 1118. Upper fill pipe 1118 may be made of any suitable material. As a non-limiting and non-exhaustive examples, it may be made from a rigid material such as a metal (i.e. aluminum, copper, stainless steel, iron, etc.) or a plastic (PVC, poly carbonate, ABS, poly propylene, etc.), or it may be made from pliable materials such as plastics, elastomers, or rubber, or it may be made of other suitable materials.

Lower fill pipe 1130 can be made of any suitable material. As non-limiting and non-exhaustive examples, it may be made from a semirigid material, similar to those used in garden hoses and automotive radiator tubing. If a semirigid material is selected, it may allow sensor shut off valve 1134 (FIG. 84) to have free movement away from any obstacles such as a bathers feet or bathtub spigots or faucets, etc.

Use of a semirigid material may also provide a watertight seal when lower fill pipe 1128 is locked in position over upper fill pipe 1118, using lower fill pipe lock 1130 to squeeze lower fill pipe 1128 around upper fill pipe 1118. Alternatively, a tight fit or an O-ring or other suitable seals may be used.

Lower fill pipe lock 1130 user selectively locks lower fill pipe 1128 onto upper fill pipe 1118, at a disposition indicating a user desired bathtub fill level. Lower fill pipe lock 1130 includes indicator arrow 1152 which points to adjacent depth indices rod 1126 which includes markings 1127 related to a desired bathtub fill level.

Depth indices rod 1126 is coupled at its top to collar 1154 which slidably couples around the lower end of upper fill pipe 1118, and may be user locked in position by set screw 1156. Bottle support arm 1124 fixedly couples to the upper portion of collar 1154, and is configured to hang up to four bath additive bottles 1122 along its length (see FIGS. 80, 82, 84, and 86).

Bath additive bottles 1122 may contain ingredients such as skin moisturizers, bubblebath, body lotions, bathing oils, dissolved bath salts, disinfectants, medications, drugs, or other suitable materials which are to be user selectively mixed into bathwater and/or shower water. Bath additive bottles 1122 may be constructed in any suitable manner. As a non-limiting and non-exhaustive examples, they may be constructed as an aerosol can, or a pump spray bottle (such as illustrated), or other suitable construction. Pump spray bottles may mimic the construction of pump spray bottles used for home cleaners such as 409 All-Purpose Cleaner Spray™ and Windex Glass Cleaner™.

A user may pump bath additive bottles 1122 to force bottle contents through bath additive feed tubes 1132 and into manifold inlet ports 1158, where bottle contents are mixed with water emanating from shower arm 1114. One-way valves 1160, disposed intermediate of one end of bath additive feed tube 1132 and manifold inlet ports 1158, prevent water from shower arm 1114 from entering into bath additive feed tube 1132. Alternatively, a one-way valve may not be necessary because typical pump spray bottles already have an internal one-way valve.

Using hanging hook 1162, up to four bath additive bottles 1122 can be hung from bottle support arm 1124.

As a non-limiting and non-exhaustive example, to install embodiment 1110, a user may remove an existing showerhead 1116 from an existing shower arm 1114. With embodiment 1110 assembled, including having upper fill pipe 1118 attached to diverter valve/manifold 1112, and bottle support arm 1124 attached to upper fill pipe 1118, and lower fill pipe 1128 attached to upper fill pipe 1118, and sensor shut off valve 1134 attached to lower fill pipe 1128; the user may attach the assembled embodiment 1110 to shower arm 1114 by screwing it to place. Water pipe connections herein, including input receptacle 1146, first output. 1148, second output, 1150, as non-limiting and non-exhaustive examples, may use standard shower pipe threads, such as, in the United States, NPT ½ inch standard tapered threats.

Following this attachment, upper fill pipe 1118 may be positioned vertically by rotating it relative to diverter valve/manifold 1112.

Next, lower fill pipe lock 1130 is loosened and re-tightened with sensor shut off valve 1134 touching the floor of associated bathtub 1101, which is disposed below shower arm 1114.

Next, the assembly of bottle support arm 1124, collar 1154, and depth indices rod 1126 is locked in position using set screw 1156, so that indicator arrow 1152 points to a predesignated position on depth indices rod 1126 so that the depth indices markings on depth indices rod 1126 are correctly calibrated to reflect bathwater depth.

Next, optionally, one or more bath additive bottles 1122 may be filled with selective liquids (such as: bubblebath, skin lotions, skin moisturizers, bath salts, bath oils, medications, prescriptions, drugs, etc.) and hung from bottle support arm 1124 using hanger hooks 1162, and bath additive feed tube 1132 may be attached to manifold inlet ports 1158 optionally using one-way valves 1160. To do this, one or more caps covering manifold inlet ports 1158 are removed and one-way valves 1160 are coupled in their stead.

Showerhead 1116 may be attached to diverter valve/manifold 1112 any time after showerhead 1116 has been detached from shower arm 1114.

To use embodiment 1110, as a non-limiting and non-exhaustive example, a user loosens lower fill pipe lock 1130 and moves lower fill pipe 1128 so that indicator arrow 1152 points to an indices 1153 on depth indices rod 1126 reflective of the bathwater depth the user desires. This may be aided by affixing stickers 1200 to the depth indices rod 1126 indicating the desired bathtub fill level for each member of the family.

After indicating the desired bathtub fill level, the user then locks lower fill pipe 1128 in position using lower fill pipe lock 1130.

The user can verify the desired bathwater depth by looking at bath fill level marking 1164 disposed on the front of sensor shut off valve 1134 (FIGS. 83 and 90).

Figure 92:
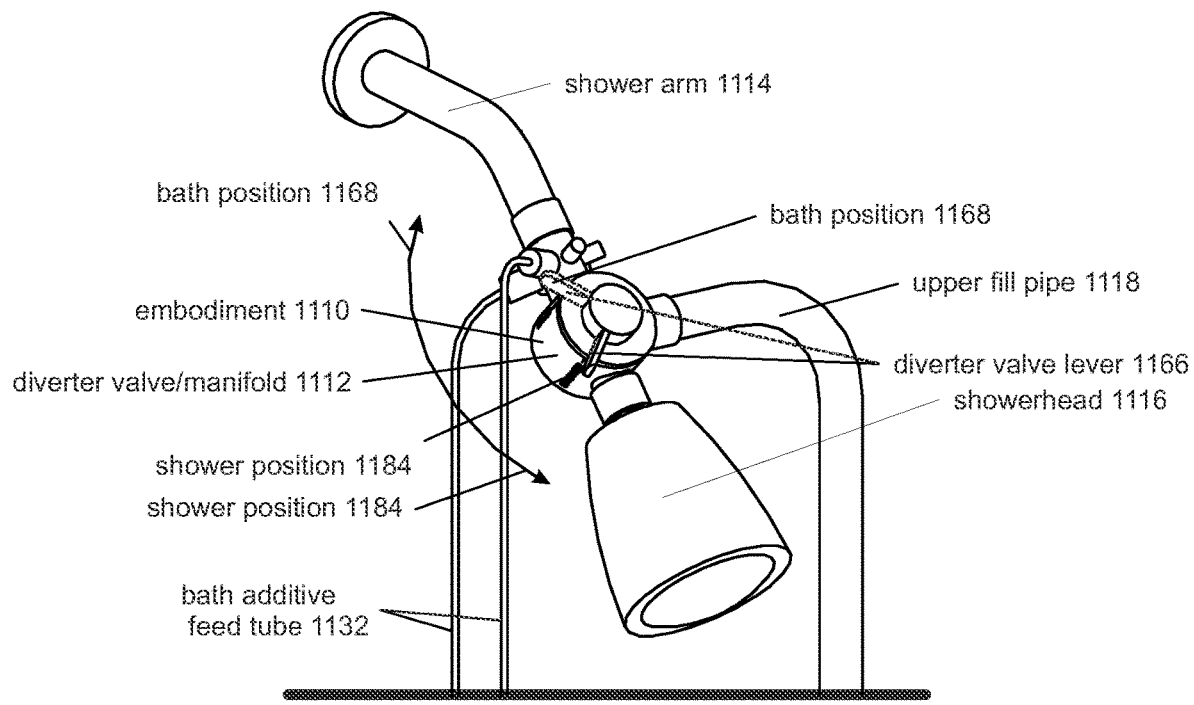
FIG. 92 is identical to FIG. 91, except with embodiment 1110 installed.

The user then sets diverter valve lever 1166 (FIG. 92) to bath position 1168 (FIG. 92). This causes water passing out of shower arm 1114 to be directed into upper fill pipe 1118, and subsequently into lower fill pipe 1128, and sensor shut off valve 1134, and finally into bathtub 1101.

The user then closes bathtub drain 1103 and turns on bathtub/shower spigot 1108 just like running a shower, including adjusting a desired water temperature.

Referring to FIGS. 87 through 90, before water fills bathtub 1101, activation float, 1140 is in its lowered position 1170, as shown in FIG. 87. In this position, float arm 1142 pivoting on fulcrum pin 1172 causes spherical shutoff plug 1136 to be in its raised 1174 position (FIG. 87) where it allows water to pass around and under spherical shutoff plug 1136 and through hole 1176 disposed in horizontal bulkhead 1178. Guide ribs 1138 help keep spherical shutoff plug 1136 centered in hole 1176.

As best shown in FIGS. 87 through 90, spherical shutoff plug 1136 is disposed within enclosed valve chamber 1185, which is capped by flanged lower fill pipe entry 1188, and has horizontal bulkhead 1178, including hole 1176, as its floor. Guide ribs 1138 project inward from the inside walls of enclosed valve chamber 1185 to provide space for water to flow around spherical shutoff plug 1136, and to guide it as it is raised. 1174 and lowered 1182.

Spherical shutoff plug 1136 may be made of any suitable material, including, as non-limiting and non-exhaustive examples, resilient materials, inclusive of hard rubber, urethanes, other elastomers, etc.; as well as it may be made from rigid materials, inclusive of ceramics, glass, metal, plastics, etc.

Water filling bathtub 1101 buoys activation float 1140 to the disposition shown in FIG. 89 where activation float 1140 is in its raised 1180 condition, and spherical shutoff plug 1136 is in its lowered 1182 condition, where it blocks water passing through hole 1176, and thus terminates water flowing into bathtub 1101 at a level set earlier by the user.

Should a user want to add hot or cold water to bathtub 1101 after it has been filled, the user may push shut off override button 1144 causing spherical shutoff plug 1136 to be raised 1174 to the disposition shown in FIG. 87, and thus allow water to flow through hole 1176 and into bathtub 1101. The user then adjusts bathtub/shower spigot 1108 to add the appropriate temperature water.

Shut off override button 1144 may also be used in the event water in lower fill pipe 1128 causes sensor shut off valve 1134 to remain in its closed position, shown in FIG. 89. Pushing shut off override button 1144 under such conditions, drains the water and causes sensor shut off valve 1134 to re-open, as shown in FIG. 87.

To take a normal shower, a user opens bathtub drain 1103, and moves diverter valve lever 1166 to shower position 1184, shown in FIG. 92, where water emanating from shower arm 1114 is diverted through showerhead 1116.

Figure 93:
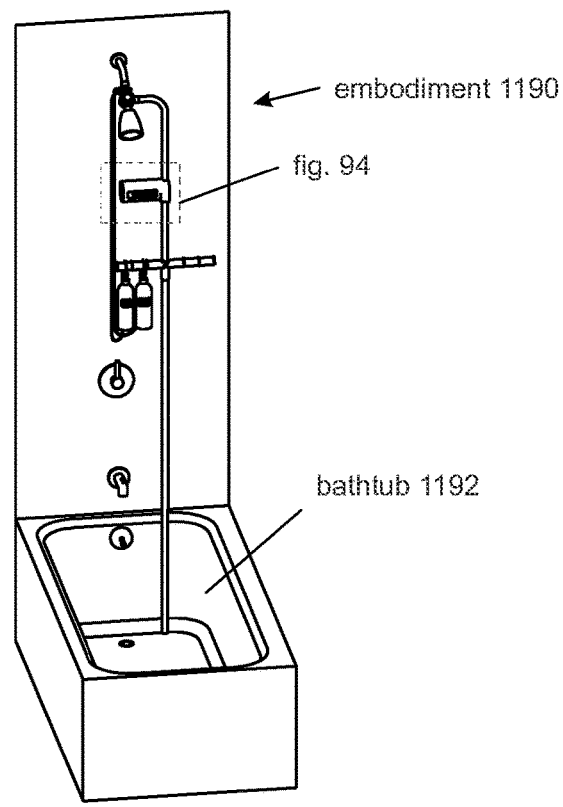
FIG. 93 is a perspective view of embodiment 1190, which uses electronic sensor 1192 to gauge the water level within bathtub 1192, and to fill it to a level designated by input buttons 1194 and display 1196.
Figure 94:
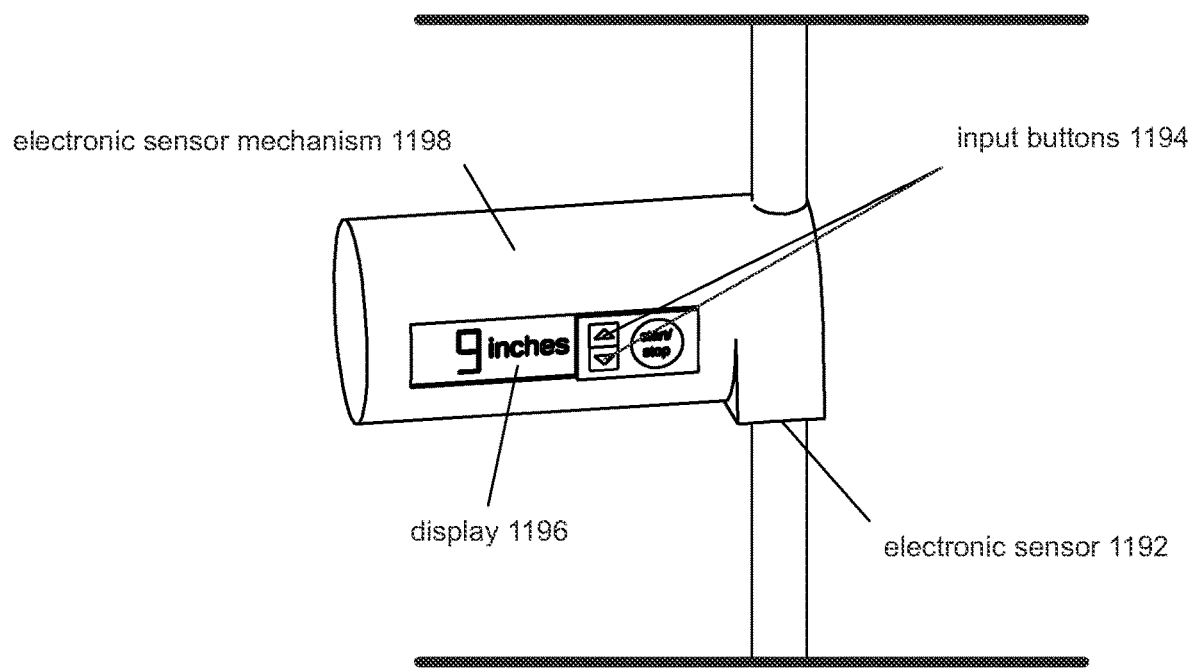
FIG. 94 illustrates an electronic sensor mechanism and a user interface of embodiment 1190.

FIGS. 93 and 94 show embodiment 1190, which utilizes electronic sensor mechanism 1198 for user input of a desired bathtub water fill level, and for detection of a water level within bathtub 1192 through use of radar or sonar or other suitable means. Electronic sensor mechanism 1198 also includes a valve to shut off the flow of water to bathtub 1192 when the user inputted desired fill level is achieved.

The invention claimed is:

1. An automatic bathtub filling device:
 a connector having a water inlet configured to couple to, and accept water from, an overhead shower arm, and the connector having a first water outlet configured to deliver water into an associated bathtub disposed below the shower arm,
 a first control input, configured to receive user input to set a volume of water within the bathtub,
 a first valve coupled intermediate of the water inlet and the first water outlet, and first valve configured to selectively terminate the flow of water between the water inlet and the first water outlet,
 a bathtub water volume monitor, responsive to a volume of water within the associated bathtub, and the bathtub water volume monitor coupled to the first control input, and coupled to the first valve, such that when a volume of water within the bathtub, detected by the bathtub water volume monitor, meets or exceeds the set volume of water, water flowing through the first valve is terminated.

2. The device of claim 1, wherein the connector includes a second water outlet configured to couple to a spray showerhead.

3. The device of claim 1, including a user operative selector valve, and the selector valve having a user input to selectively direct water accepted by the connector from the overhead shower arm to flow out of the first water outlet, or to flow out of the second water outlet.

4. The device of claim 1, wherein the connector includes a first liquid ingredient inlet configured to accept liquid ingredients, and the connector being configured to mix the accepted liquid ingredients into water the connector received from the overhead shower arm.

5. The device of claim 4, further comprising a liquid ingredient reservoir, including a pump configured to drive liquid ingredients contained in the liquid ingredient reservoir into the first liquid ingredient inlet.

6. The device of claim 5, wherein the pump is configured to be manually activated.

7. The device of claim 1, wherein the bathtub water volume monitor includes a float buoyant in water within the associated bathtub.

8. The device of claim 1, wherein the bathtub water volume monitor is electrically powered.

\* \* \* \* \*